(12) United States Patent
Kim

(10) Patent No.: US 8,103,296 B2
(45) Date of Patent: Jan. 24, 2012

(54) MOBILE TERMINAL AND METHOD OF DISPLAYING INFORMATION IN MOBILE TERMINAL

(75) Inventor: Taeyong Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 150 days.

(21) Appl. No.: 12/724,080

(22) Filed: Mar. 15, 2010

(65) Prior Publication Data

US 2010/0311445 A1    Dec. 9, 2010

(30) Foreign Application Priority Data

Jun. 8, 2009   (KR) ..................... 10-2009-0050293

(51) Int. Cl.
   *H04W 4/12*   (2009.01)
(52) U.S. Cl. ......... 455/466; 455/566; 715/764; 709/203
(58) Field of Classification Search .............. 455/466, 455/566; 715/764; 709/203, 223
See application file for complete search history.

(56) References Cited

U.S. PATENT DOCUMENTS

| | | | |
|---|---|---|---|
| 5,832,229 A * | 11/1998 | Tomoda et al. | 709/227 |
| 7,136,915 B2 * | 11/2006 | Rieger, III | 709/223 |
| 2006/0277504 A1 | 12/2006 | Zinn | |

FOREIGN PATENT DOCUMENTS

EP   2051161   4/2009

OTHER PUBLICATIONS

Salesforce Mobile Team (sfdcMktg), "Calendar-Like Event List View for iPhone—Salesforce Summer '09," YouTube, url:http://www.youtube.com/watch?v=kTdcyxtFxFc, May 2009, XP-002599951.
Rodman988, "iPhone Calendar Program Review," YouTube, url:http://www.youtube.com/watch?v=MfpnteZVFjl&feature=related, Aug. 2007, XP-002599954.

* cited by examiner

*Primary Examiner* — Phuoc Doan
(74) *Attorney, Agent, or Firm* — Lee, Hong, Degerman, Kang & Waimey

(57) ABSTRACT

A mobile terminal and a method of displaying information in the mobile terminal are provided. The mobile terminal conveniently provides a plurality of item groups which respectively include at least one item and respectively have different group identifiers to a user. For example, a specific group identifier can remain on a screen when the screen is scrolled, and thus the user is easily aware of properties or categories of items currently displayed on the screen.

20 Claims, 22 Drawing Sheets

FIG. 20

| Item | Description |
|---|---|
| eST-NONE | Unknown alignment |
| eST-SUBJECT | Align based on message title |
| eST-FROM | Align based on message sender |
| eST-TO | Align based on message recipient |
| eST-DATE | Align based on message receiving date |
| eST-READ | Align based on whether message is read |
| eST-TYPE | Align based on message type (SMS/MMS/CB/WAPPUSH/EMAIL) |
| eST-READFROM | Align based on message sender and whether message is read |
| eST-READTO | Align based on message recipient and whether message is read |
| eST-READSUBJECT | Align based on message title and whether message is read |
| eST-READDATE | Align based on message receiving date and whether message is read |
| eST-UNREADDATE | Align based on message receiving date and whether message is unread |
| eST-READTYPE | Align based on message type and whether message is read |
| eST-ATTACHDATE | Align based on attachment file date |
| eST-MSGSIZEDATE | Align based on message size and date |
| eST-PRIORITYDATE | Align based on message priority and date |
| eST-PROTECTDATE | Align based on message priority and date |
| eST-UNPROTECTDATE | Align based on message unprotection and date |

MOBILE TERMINAL AND METHOD OF DISPLAYING INFORMATION IN MOBILE TERMINAL

Pursuant to 35 U.S.C. §119(a), this application claims the benefit of earlier filing date and right of priority to Korean Patent Application No. 10-2009-0050293 filed on Jun. 8, 2009, the contents of which is hereby incorporated by reference herein in its entirety.

BACKGROUND OF THE INVENTION

1. Field of the Invention

The present invention relates to a mobile terminal, and more particularly, to a mobile terminal and a method of displaying information in the mobile terminal for conveniently providing a plurality of item groups respectively including at least one item and respectively having different group identifiers to a user.

2. Discussion of the Related Art

A conventional mobile terminal displays a plurality of items on a display screen in such a manner that items belonging to the same category are classified as a specific group, an identifier is given to the specific group and the specific group and the identifier are displayed together to allow a user to know the property of the specific group according to the identifier.

However, the conventional mobile terminal provides items, item groups and identifiers to the user in a very simple manner, and thus the user cannot make the most use of the original function of the identifiers and monotonous display is provided to the user.

SUMMARY OF THE INVENTION

Accordingly, one object of the present invention is to address the above-noted and other drawbacks of the related art.

Another object of the present invention is to provide a mobile terminal and a method of displaying information in the mobile terminal for conveniently providing a plurality of item groups respectively including at least one item and respectively having different group identifiers to a user.

To accomplish the objects of the present invention, according to an aspect of the present invention, there is provided a mobile terminal including a memory configured to store a plurality of items corresponding to a plurality of item groups respectively having different group identifiers; a display unit configured to include an information region in which the plurality of item groups and the group identifiers are displayed in such a manner that the plurality of item groups respectively correspond to the group identifiers; and a controller configured to display at least one of the plurality of item groups and at least one group identifier corresponding to the at least one item group in the information region such that the at least one item group and the at least one group identifier corresponding to the at least one item group can be scrolled, wherein the controller is configured to fix a first group identifier among the at least one group identifier to a predetermined first position until the last item of the item group corresponding to the first group identifier reaches the first position when the first group identifier arrives at the first position while the information region is scrolled in a first direction according to a first scroll command for scrolling the information region in the first direction.

To accomplish the objects of the present invention, according to another aspect of the present invention, there is provided a method of displaying information in a mobile terminal, the method including proceeding to a display screen including an information region for displaying a plurality of items corresponding to a plurality of item groups respectively having different group identifiers; displaying at least one of the plurality of item groups and at least one group identifier corresponding to the at least one item group such that the at least one item group and the at least one group identifier can be scrolled; and scrolling the information region in a first direction according to a first scroll command for scrolling the information region in the first direction, wherein the scrolling of the information region in the first direction comprises fixing a first group identifier among the at least one group identifier to a predetermined first position until the last item of the item group corresponding to the first group identifier reaches the first position when the first group identifier arrives at the first position.

According to the mobile terminal and the method of displaying information in the mobile terminal according to the present invention, a plurality of items respectively including at least one item and respectively having different group identifiers can be conveniently provided to a user.

Particularly, a specific group identifier can remain on a screen when the screen is scrolled, and thus the user is easily aware of properties or categories of items currently displayed on the screen.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 20 illustrates various exemplary standards for classifying a plurality of e-mail items;

DETAILED DESCRIPTION OF THE PREFERRED EMBODIMENTS

Reference will now be made in detail to the preferred embodiments of the present invention, examples of which are illustrated in the accompanying drawings.

A mobile terminal described in the specification may include a cellular phone, a smart phone, a laptop computer, a digital broadcasting terminal, personal digital assistants (PDA), a portable multimedia player (PMP), a navigation system, etc.

Figure 1:
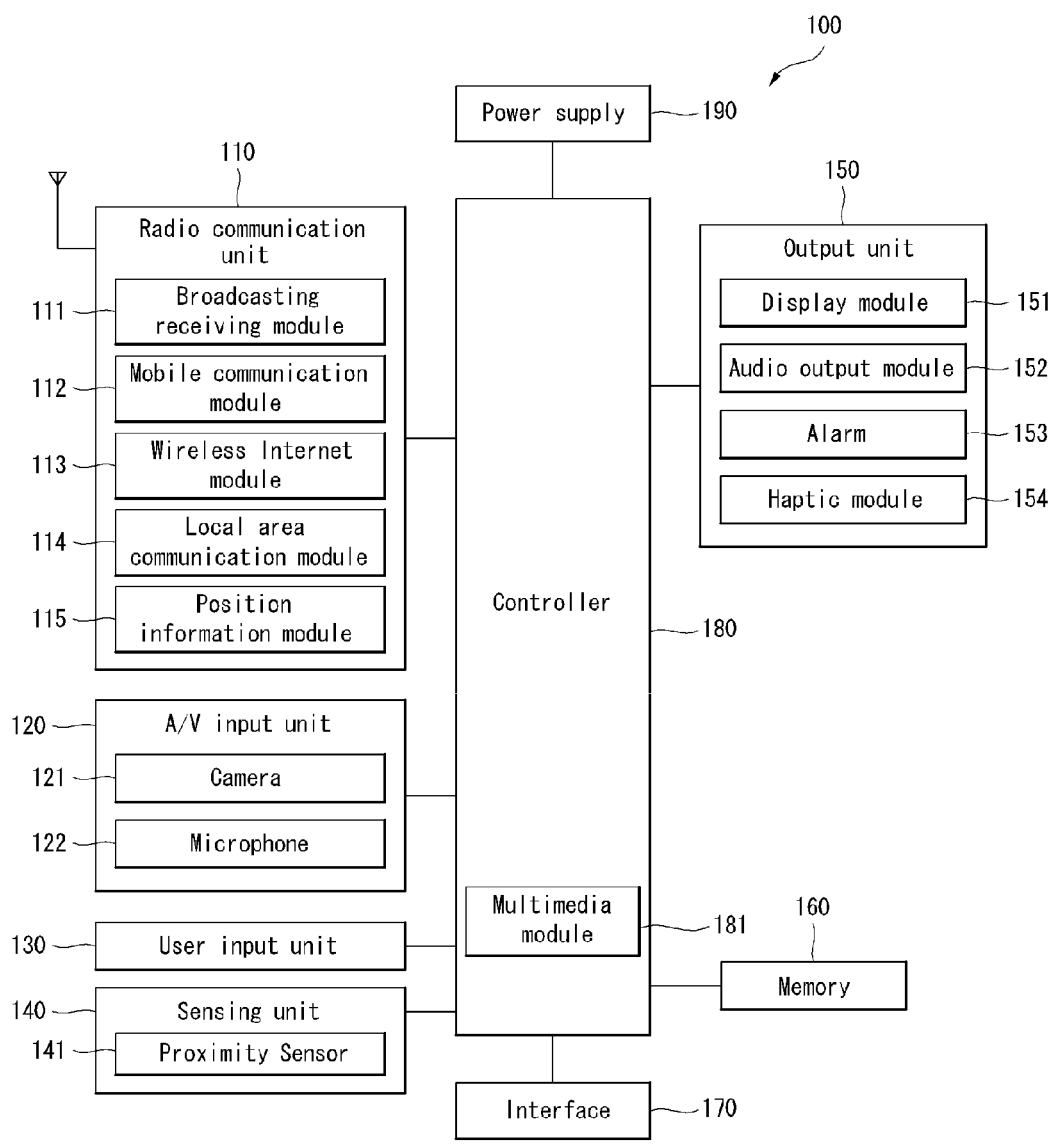
FIG. 1 is a block diagram of a mobile terminal according to an embodiment of the present invention.

FIG. 1 is a block diagram of a mobile terminal 100 according to an embodiment of the present invention. As shown, the mobile terminal 100 includes a radio communication unit 110, an audio/video (A/V) input unit 120, a user input unit 130, a sensing unit 140, an output unit 150, a memory 160, an interface 170, a controller 180, and a power supply 190.

In addition, the radio communication unit 110 includes at least one module that enables radio communication between the mobile terminal 100 and a radio communication system or between the mobile terminal 100 and a network in which the mobile terminal 100 is located. For example, the radio communication unit 110 includes a broadcasting receiving module 111, a mobile communication module 112, a wireless Internet module 113, a local area communication module 114 and a position information module 115.

The broadcasting receiving module 111 receives broadcasting signals and/or broadcasting related information from an external broadcasting management server through a broadcasting channel. Also, the broadcasting channel can include a satellite channel and a terrestrial channel, and the broadcasting management server can be a server that generates and transmits broadcasting signals and/or broadcasting related information or a server that receives previously created broadcasting signals and/or broadcasting related information and transmits the broadcasting signals and/or broadcasting related information to a terminal.

Further, the broadcasting signals can include not only TV broadcasting signals, radio broadcasting signals and data broadcasting signals, but also signals in the form of combination of a TV broadcasting signal and a radio broadcasting signal. In addition, the broadcasting related information can be information on a broadcasting channel, a broadcasting program or a broadcasting service provider, and can be provided even through a mobile communication network. In the latter case, the broadcasting related information can be received by the mobile communication module 112.

Also, the broadcasting related information can exist in various forms. For example, the broadcasting related information can exist in the form of an electronic program guide (EPG) of the digital multimedia broadcasting (DMB) system or in the form of an electronic service guide (ESG) of the digital video broadcast-handheld (DVB-H) system.

In addition, the broadcasting receiving module 111 receives broadcasting signals using various broadcasting systems. Particularly, the broadcasting receiving module 111 can receive digital broadcasting signals using digital broadcasting systems such as the digital multimedia broadcasting-terrestrial (DMB-T) system, the digital multimedia broadcasting-satellite (DMB-S) system, the media forward link only (MediaFLO) system, the DVB-H and integrated services digital broadcast-terrestrial (ISDB-T) systems, etc. The broadcasting receiving module 111 can also be constructed to be suited to broadcasting systems providing broadcasting signals other than the above-described digital broadcasting systems.

Further, the broadcasting signals and/or broadcasting related information received through the broadcasting receiving module 111 can be stored in the memory 160. The mobile communication module 112 transmits/receives a radio signal to/from at least one of a base station, an external terminal and a server on a mobile communication network. The radio signal can include a voice call signal, a video telephony call signal or data in various forms according to transmission and reception of text/multimedia messages.

In addition, the wireless Internet module 113 corresponds to a module for wireless Internet access and can be included in the mobile terminal 100 or externally attached to the mobile terminal 100. A wireless LAN (WLAN) (Wi-Fi), wireless broadband (Wibro), world interoperability for microwave access (Wimax), high speed downlink packet access (HSDPA) and so on can be used as a wireless Internet technique.

Also, the local area communication module 114 corresponds to a module for local area communication. Further, bluetooth, radio frequency identification (RFID), infrared data association (IrDA), ultra wideband (UWB) and ZigBee can be used as a local area communication technique.

The position information module 115 confirms or obtains the position of the mobile terminal. The position information module 115 can obtain position information by using a global navigation satellite system (GNSS). The GNSS is a terminology used to explain radio navigation satellite systems which revolve around the earth to send reference signals to radio navigation receivers of a predetermined type such that the radio navigation receivers can determine their positions on or near the surface of the earth. The GNSS include the global position system (GPS) administrated by the United States, Galileo administrated by Europe, Global Orbiting Navigation Satellite System (GLONASS) administrated by Russia, COMPASS administrated by China and Quasi-Zenith Satellite System (QZSS) administrated by Japan.

In more detail, a global positioning system (GPS) module is a representative example of the position information module 115. In addition, the GPS module 115 can calculate information on distances between one point or object and at least three satellites and information on the time when the distance information is measured and apply trigonometry to the obtained distance information to obtain three-dimensional position information on the point or object according to the latitude, longitude and altitude at a predetermined time.

Furthermore, a method of calculating position and time information using three satellites and correcting the calculated position and time information using another satellite can also used. In addition, the GPS module 115 continuously calculates the current position in real time and calculates velocity information using the position information.

Referring to FIG. 1, the A/V input unit 120 is used to input an audio signal or a video signal and includes a camera 121 and a microphone 122. The camera 121 processes image frames of still images or moving images obtained by an image sensor in a video telephony mode or a photographing mode. Further, the processed image frames can be displayed on a display unit 151.

Also, the image frames processed by the camera 121 can be stored in the memory 160 or transmitted to an external device through the radio communication unit 110. The mobile terminal 100 can also include at least two cameras. The microphone 122 receives an external audio signal in a call mode, a recording mode or a speed recognition mode and processes the received audio signal into electric audio data.

The audio data can then be converted into a form that can be transmitted to a mobile communication base station through the mobile communication module 112 and output in the call mode. Further, the microphone 122 can employ various noise removal algorithms for removing noise generated when the external audio signal is received.

In addition, the user input unit 130 receives input data for controlling the operation of the terminal from a user. The user input unit 130 can include a keypad, a dome switch, a touch pad (constant voltage/capacitance), jog wheel, jog switch and so on.

Also, the sensing unit 140 senses the current state of the mobile terminal 100, such as an open/close state of the mobile terminal 100, the position of the mobile terminal 100, whether a user touches the mobile terminal 100, the direction of the mobile terminal 100 and the acceleration/deceleration of the mobile terminal 100, and generates a sensing signal for controlling the operation of the mobile terminal 100.

For example, the sensing unit 140 can sense whether a slide phone is opened or closed when the mobile terminal 100 is the slide phone. Furthermore, the sensing unit 140 can sense whether the power supply 190 supplies power and whether the interface 170 is connected to an external device. The sensing unit 140 can also include a proximity sensor 141.

In addition, the output unit 150 generates visual, auditory or tactile output and can include the display unit 151, an audio output module 152, an alarm 153 and a haptic module 154. Further, the display unit 151 displays information processed by the mobile terminal 100. For example, the display unit 151 displays a user interface (UI) or graphic user interface (GUI) related to a telephone call when the mobile terminal is in the call mode. The display unit 151 also displays a captured or/and received image, UI or GUI when the mobile terminal 100 is in the video telephony mode or the photographing mode.

In addition, the display unit 151 can include at least one of a liquid crystal display, a thin film transistor liquid crystal display, an organic light-emitting diode display, a flexible display and a three-dimensional display. Further, some of these displays can be of a transparent type or a light transmission type. That is, the display unit 151 can include a transparent display.

In more detail, the transparent display includes a transparent liquid crystal display. Further, the rear structure of the display unit 151 can also be of the light transmission type. Accordingly, a user can see an object located behind the body of the mobile terminal 100 through the transparent area of the body of the mobile terminal 100, which is occupied by the display unit 151.

The mobile terminal 100 can also include at least two display units 151. For example, the mobile terminal 100 can include a plurality of displays that are arranged on a single face at a predetermined distance or integrated displays. The plurality of displays can also be arranged on different sides.

In addition, when the display unit 151 and a sensor sensing touch (referred to as a touch sensor hereinafter) form a layered structure, which is referred to as a touch screen hereinafter, the display unit 151 can be used as an input device in addition to an output device. The touch sensor can be in the form of a touch film, a touch sheet and a touch pad, for example.

Further, the touch sensor can be constructed to convert a variation in pressure applied to a specific portion of the display unit 151 or a variation in capacitance generated at a specific portion of the display unit 151 into an electric input signal. The touch sensor can also be constructed to sense pressure of touch as well as the position and area of the touch.

Also, when the user applies touch input to the touch sensor, a signal corresponding to the touch input is transmitted to a touch controller. The touch controller then processes the signal and transmits data corresponding to the processed signal to the controller 180. Accordingly, the controller 180 can detect a touched portion of the display 151.

Referring to FIG. 1, the proximity sensor 141 of the sensing unit 140 can be located in an internal region of the mobile terminal, surrounded by the touch screen, or near the touch screen. The proximity sensor 141 senses an object approaching a predetermined sensing face or an object located near the proximity sensor 141 using an electromagnetic force or infrared rays without having mechanical contact. Further, the proximity sensor 141 has lifetime longer than that of a contact sensor and thus has a wide application in the mobile terminal 100.

In addition, the proximity sensor 141 includes a transmission type photo-electric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, etc. Further, a capacitive touch screen is constructed such that proximity of a pointer is detected through a variation in an electric field according to the proximity of the pointer. In this instance, the touch screen (touch sensor) can be classified as a proximity sensor.

For convenience of explanation, the action of the pointer approaching the touch screen without actually touching the touch screen is referred to as "proximity touch" and an action of bringing the pointer into contact with the touch screen is referred to as "contact touch" in the following description. In addition, the proximity touch point of the pointer on the touch screen corresponds to a point of the touch screen to which the pointer touches the touch screen.

Further, the proximity sensor 141 senses the proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern can then be displayed on the touch screen.

Also, the audio output module 152 can output audio data received from the radio communication unit 110 or stored in the memory 160 in a call signal receiving mode, a telephone call mode or a recording mode, a speech recognition mode and a broadcasting receiving mode. Further, the audio output module 152 outputs audio signals related to functions (for example, a call signal incoming tone, a message incoming tone, etc.) performed in the mobile terminal 100. The audio output module 152 can include a receiver, a speaker, a buzzer, etc. Moreover, the audio output module 152 can output sounds through an earphone jack. The user can hear the output sounds by connecting an earphone to the earphone jack.

In addition, the alarm 153 outputs a signal for indicating the generation of an event of the mobile terminal 100. For example, alarms can be generated when receiving a call signal, receiving a message, inputting a key signal, inputting touch, etc. The alarm 153 can also output signals in forms different from video signals or audio signals, for example, a signal for indicating generation of an event through vibration. The video signals or the audio signals can be also output through the display unit 151 or the audio output module 152.

Also, the haptic module 154 generates various haptic effects that the user can feel. One representative example of the haptic effects is vibration. The intensity and pattern of vibration generated by the haptic module 154 can also be controlled. For example, different vibrations can be combined and output or can be sequentially output.

Further, the haptic module 154 can generate a variety of haptic effects including an effect of stimulus according to arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 can also not only transmit haptic effects through direct contact but also allow the user to feel haptic effects through a kinesthetic sense of the user's fingers or arms. The mobile terminal 100 can also include multiple haptic modules 154.

In addition, the memory 160 can store a program for the operation of the controller 180 and temporarily store input/output data (for example, phone book, messages, still images, moving images, etc.). The memory 160 can also store data about vibrations and sounds in various patterns, which are output from when a touch input is applied to the touch screen.

Further, the memory 160 can include at least one of a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM) magnetic memory, a magnetic disk and an optical disk. The mobile terminal 100 can also operate in relation to a web storage performing the storing function of the memory 160 on the Internet.

The interface 170 serves as a path to external devices connected to the mobile terminal 100. Further, the interface 170 receives data from the external devices or power and transmits the data or power to the internal components of the mobile terminal 100 or transmits data of the mobile terminal 100 to the external devices. Also, the interface 170 can include a wired/wireless headset port, an external charger port, a wired/wireless data port, a memory card port, a port for connecting a device having a user identification module, an audio I/O port, a video I/O port, an earphone port, etc., for example.

In addition, the interface 170 can also interface with a user identification module that is a chip that stores information for authenticating the authority to use the mobile terminal 100. For example, the user identification module can be a user identify module (UIM), a subscriber identify module (SIM) and a universal subscriber identify module (USIM). An identification device including the user identification module can also be manufactured in the form of a smart card. Accordingly, the identification device can be connected to the mobile terminal 100 through a port of the interface 170.

The interface 170 can also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle can be used as signals for confirming whether the mobile terminal is correctly set in the cradle.

In addition, the controller 180 controls the overall operations of the mobile terminal. For example, the controller 180 performs control and processing for voice communication, data communication and video telephony. As shown in FIG. 1, the controller 180 also includes a multimedia module 181 for playing multimedia. Also, the multimedia module 181 can be included in the controller 180 as shown in FIG. 1 or can be separated from the controller 180.

Further, the controller 180 can perform a pattern recognition process capable of recognizing handwriting input or picture-drawing input applied to the touch screen as characters or images. In addition, the power supply 190 receives external power and internal power and provides power required for the operations of the components of the mobile terminal under the control of the controller 180.

Embodiments of the present invention can be implemented in a computer or similar device readable recording medium by using software, hardware or a combination thereof, for example.

According to hardware implementation, the embodiments of the present invention can be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units for executing functions. In some cases, the embodiments can be implemented by the controller 180.

According to software implementation, embodiments such as procedures or functions can be implemented with a separate software module executing at least one function or operation. Software codes can be implemented according to a software application written in an appropriate software language. Furthermore, the software codes can be stored in the memory 160 and executed by the controller 180.

Figure 2A:
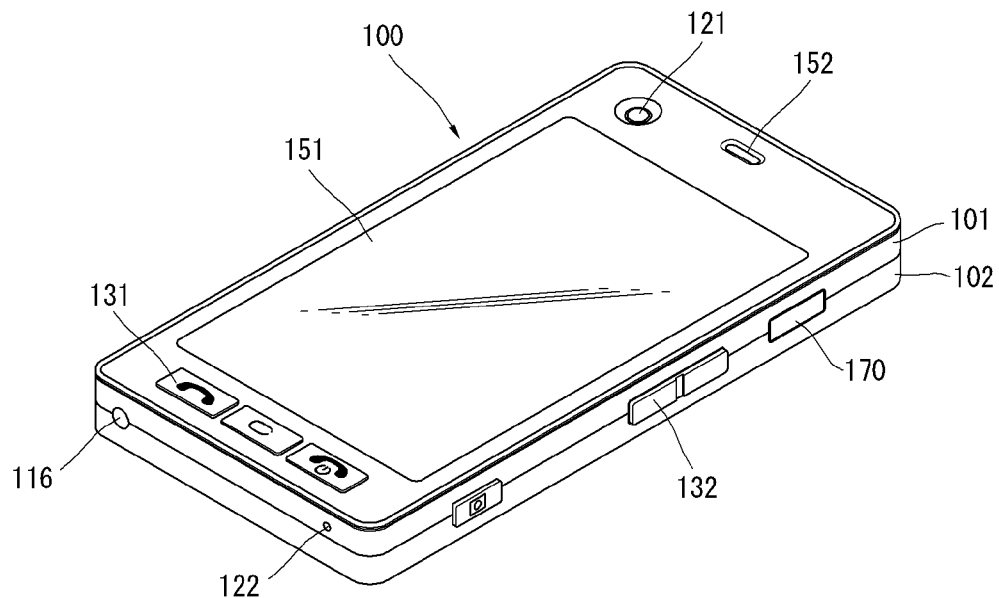
FIG. 2a is a front perspective view of the mobile terminal according to an embodiment of the present invention.

FIG. 2A is a front perspective view of a mobile terminal or a handheld terminal 100 according to an embodiment of the present invention. In this example, the handheld terminal 100 is a bar type terminal body. However, the present invention is not limited to a bar type terminal and can be applied to terminals of various types including slide type, folder type, swing type and swivel type terminals.

In addition, the terminal body includes a case (a casing, a housing, a cover, etc.) forming the exterior of the terminal 100. In the present embodiment, the case is divided into a front case 101 and a rear case 102. Further, various electronic components are arranged in the space formed between the front case 101 and the rear case 102. At least one middle case can also be additionally arranged between the front case 101 and the rear case 102. Also, the cases can be formed of plastics through injection molding or made of a metal material such as stainless steel (STS) or titanium (Ti).

As shown in FIG. 2A, the display unit 151, the audio output unit 152, the camera 121, user input units 131 and 132, the microphone 122 and the interface 170 are arranged in the terminal body, specifically, in the front case 101. In addition, the display unit 151 occupies most of the main face of the front case 101.

Further, the audio output unit 152 and the camera 121 are arranged in a region in proximity to one of both ends of the display unit 151. Also, the user input unit 131 and the microphone 122 are located in a region in proximity to the other end of the display unit 151. Also include is another user input unit 132, which is arranged with the interface 170 on the sides of the front case 101 and the rear case 102.

Thus, in this embodiment, the user input unit 130 includes multiple operating units 131 and 132 that are operated to receive commands for controlling the operation of the handheld terminal 100. Further, the operating units 131 and 132 can be referred to as manipulating portions and employ any tactile manner in which a user operates the operating units 131 and 132 while producing a tactile feeling.

Also, the operating units 131 and 132 can receive various inputs. For example, the operating unit 131 receives commands such as start and end a call, and the operating unit 132 receives commands such as to control the volume of the sound output from the audio output unit 152 or to convert the display unit 151 into a touch recognition mode.

Figure 2B:
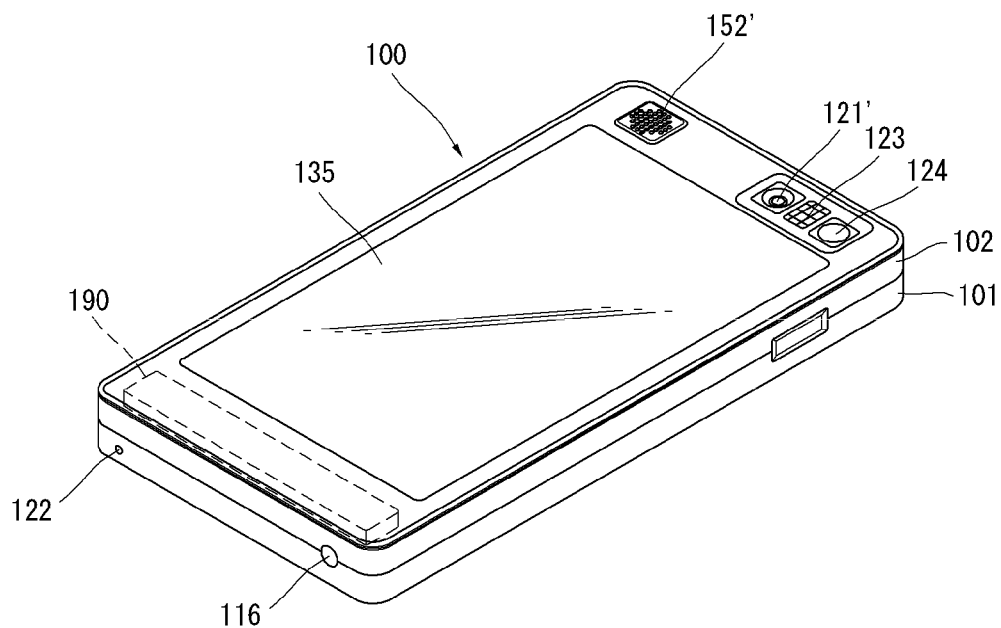
FIG. 2b is a rear perspective view of the mobile terminal according to an embodiment of the present invention.

Next, FIG. 2B is a rear perspective view of the handheld terminal shown in FIG. 2A according to an embodiment of the present invention. As shown in FIG. 2B, a camera 121' is additionally attached to the rear side of the terminal body, that is, the rear case 102. In this configuration, the camera 121' has a photographing direction that is opposite to that of the camera 121 shown in FIG. 2a and can have pixels different from those of the camera 121 shown in FIG. 2A.

For example, in one example, it is preferable that the camera 121 has low pixels such that it can capture an image of the face of a user and transmit the image to a receiving part during video telephony while the camera 121' has high pixels such that it can capture an image of a general object and does not immediately transmit the image in many situations. The cameras 121 and 121' can also be attached to the terminal body such that they can be rotated or popped-up.

As shown in FIG. 2B, a flash bulb 123 and a mirror 124 are additionally arranged in proximity to the camera 121'. The flash bulb 123 lights an object when the camera 121' takes a picture of the object, and the mirror 124 is used for the user to look at his or her face when the user wants to take a picture of themselves using the camera 121'.

An audio output unit 152' is also additionally provided on the rear side of the terminal body. In this embodiment, the audio output unit 152' can achieve a stereo function with the audio output unit 152 shown in FIG. 2A and be used in a speaker phone mode when the terminal is used for a telephone call.

A broadcasting signal receiving antenna 116 can also be additionally attached to a side of the terminal body in addition to an antenna for telephone calls. The antenna 116 forming a part of the broadcasting receiving module 111 shown in FIG. 1 can be set in the terminal body such that the antenna can be pulled out of the terminal body.

In addition, the power supply 190 for providing power to the handheld terminal 100 is set in the terminal body, and can be included in the terminal body or detachably attached to the terminal body. FIG. 2B also illustrates a touch pad 135 for sensing touch additionally attached to the rear case 102 of the terminal 100. Further, the touch pad 135 can be a light transmission type as the display module 151. In this instance, when the display module 151 outputs visual information through both sides, the visual information can be recognized through the touch pad 135.

Also, the information output through both sides of the display module 151 can be controlled by the touch pad 135. In addition, a display can be additionally attached to the touch pad 135 such that a touch screen can be arranged even in the rear case 102. Further, the touch pad 135 operates in connection with the display module 151 of the front case 101, and can be located in parallel with the display module 151 behind the display module 151. The touch panel 135 can also be identical to or smaller than the display unit 151 in size.

The interoperations of the display unit 151 and the touch pad 135 will now be described with reference to FIGS. 3A and 3B. In more detail, FIGS. 3A and 3B are front views of the handheld terminal 100 and are used for explaining an operating state of the handheld terminal according to an embodiment of the present invention.

The display module 151 can display various types of visual information in the form of characters, numerals, symbols, graphic or icons. To input the information, at least one of the characters, numerals, symbols, graphic and icons are displayed in predetermined arrangement in the form of a keypad. Also, the keypad can be referred to as a 'soft key'.

Figure 3A:
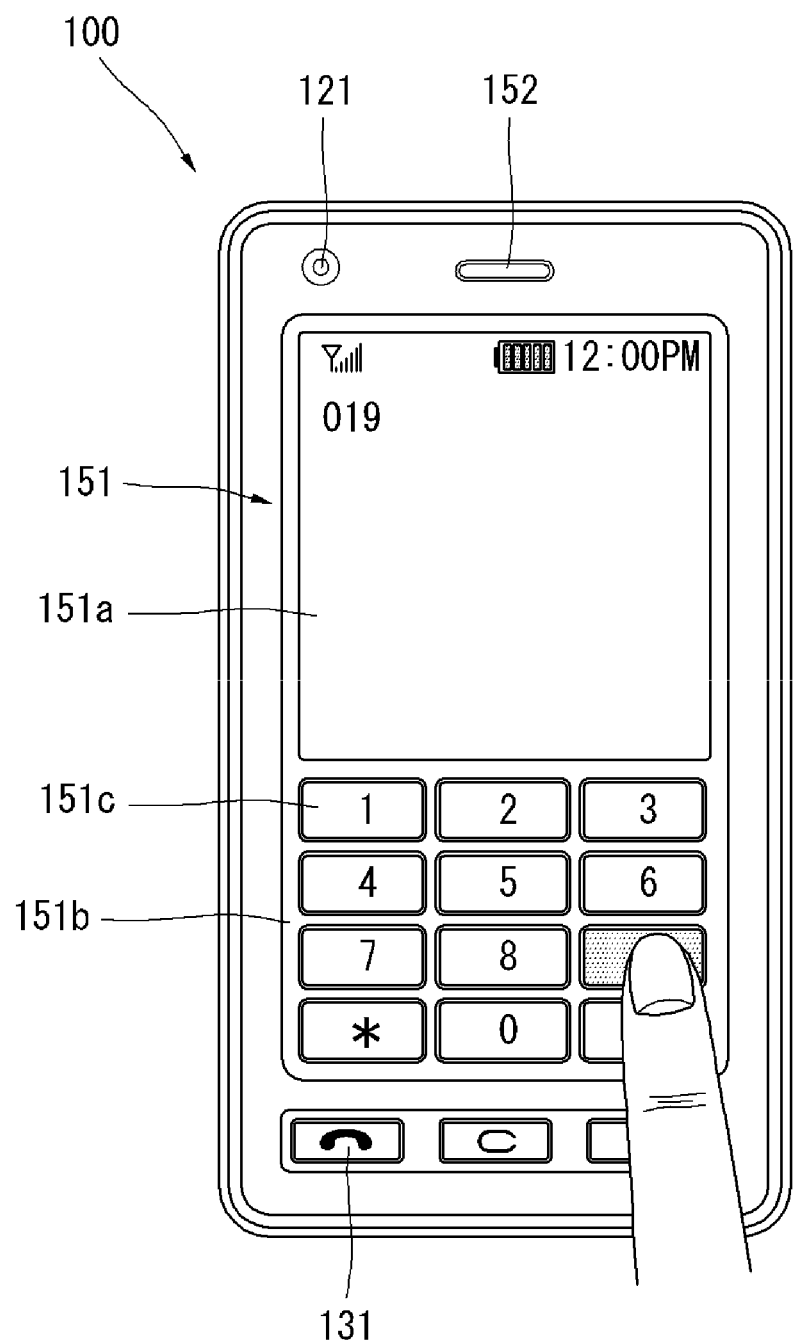
FIGS. 3a and 3b are front views of the mobile terminal according to the present invention for explaining an operating state of the mobile terminal.
Figure 3B:
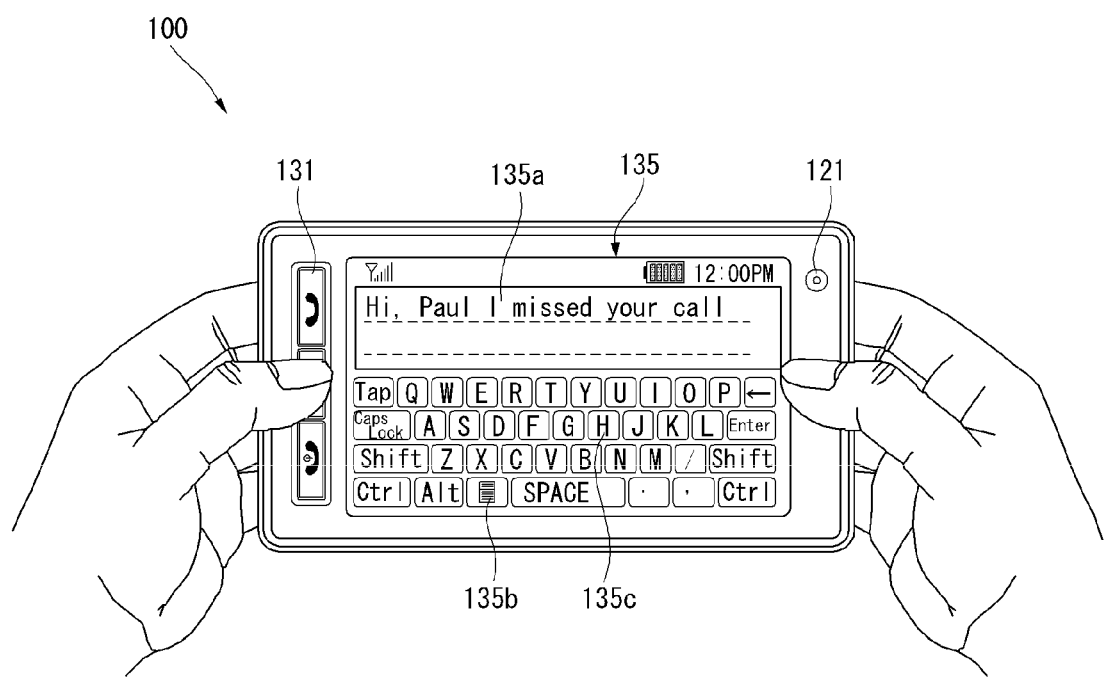

Further, FIG. 3A shows that touch applied to a soft key is input through the front side of the terminal body. The display module 151 can be a single area or can be divided into a plurality of regions. In the latter instance, the display unit 151 is constructed such that the plurality of regions interoperate with each other.

For example, and as shown in FIG. 3A, an output region 151a and an input region 151b are respectively displayed in upper and lower parts of the display module 151. The input region 151b displays soft keys 151c that represent numerals used to input numbers such as telephone numbers. Thus, when a soft key 151c is touched, a numeral corresponding to the touched soft key is displayed on the output region 151a. Further, when the user operates the first operating unit 131, a connection of a call corresponding to a telephone number displayed on the output region 151a is attempted.

Next, FIG. 3B is an overview of the mobile terminal 100 showing that touch applied to soft keys is input through the rear side of the terminal body. FIG. 3B also shows the landscape of the terminal body while FIG. 3A shows the portrait of the terminal body. In addition, the display unit 151 is constructed such that an output image is converted according to the direction in which the terminal body is located.

Further, FIG. 3B shows the operation of the handheld terminal in a text input mode. As shown, the display unit 151 includes a touch pad display 135 having an output region 135a and an input region 135b. A plurality of soft keys 135c indicating at least one of characters, symbols and numerals are also arranged in the input region 135b. Further, in this embodiment, the soft keys 135c are arranged in the form of QWERTY keys.

Thus, when the soft keys 135c are touched through the touch pad 135, the characters, numerals and symbols corresponding to the touched soft keys 135c are displayed on the output region 135a. Touch input through the touch pad 135 can prevent the soft keys 135c from being covered with user's fingers when the soft keys 135c are touched as compared to touch input through the display unit 151. Further, when the display unit 151 and the touch pad 135 are transparent, the user can see his or her fingers located behind the terminal body, and thus can select items by touching the backside or surface of the displayed keys 135c.

In addition, the user can scroll the display unit 151 or the touch pad 135 to move an object displayed on the display unit 151, for example, by using a cursor or a pointer located on an icon. Also, when the user moves his or her finger on the display unit 151 or the touch pad 135, the controller 180 can visually display the user's finger moving path on the display unit 151. This is useful to edit an image displayed on the display unit 151.

Also, when the display unit 151 (touch screen) and the touch pad 135 are simultaneously touched within a predetermined period of time, a specific function of the terminal can be executed. For example, the user can clamp the terminal body using their thumb and index finger. This specific function can include activating or deactivating the display unit 151 or the touch pad 135, for example.

Embodiments of the present invention will now be explained. It is assumed that the display unit 151 corresponds to a touch screen for convenience of explanation. As described above, the touch screen 151 can perform both the function of displaying information and the function of inputting information. However, the present invention is not limited thereto. Further, touch may include contact touch and proximity touch. The proximity touch will be explained in detail later with reference to FIG. 23.

Figure 4:
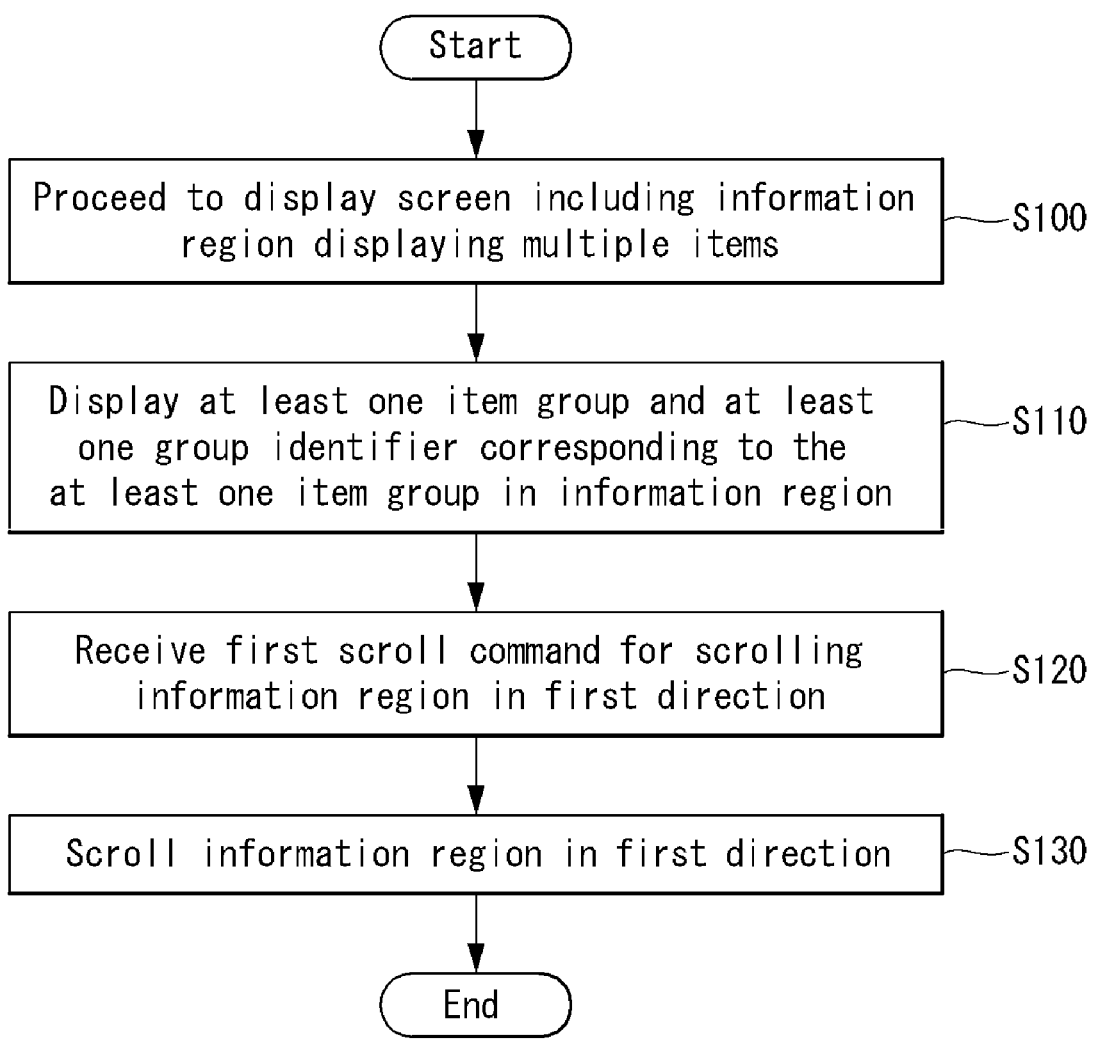
FIG. 4 is a flowchart showing a method of displaying information in a mobile terminal according to a first embodiment of the present invention.
Figure 5:
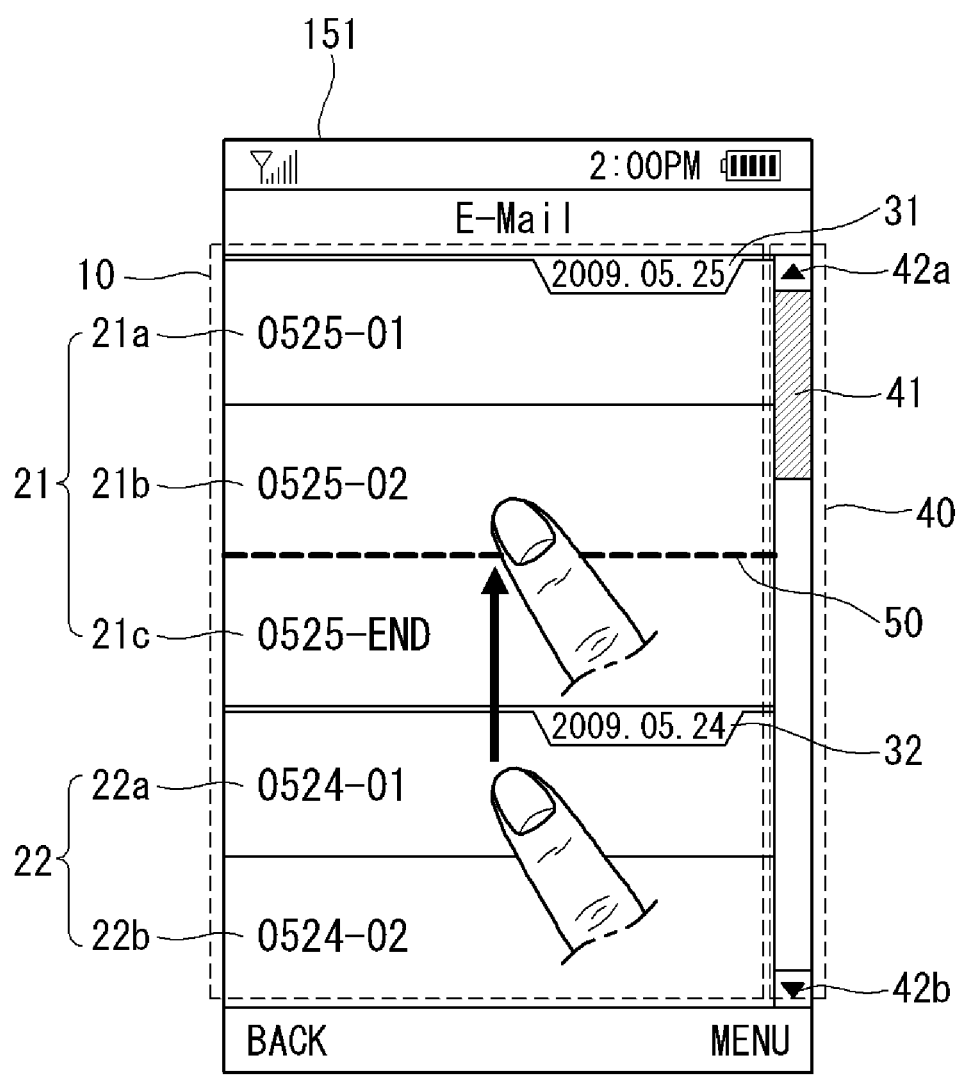
FIG. 5 illustrates an exemplary image displayed terminal when step S110 of FIG. 4 is performed.

FIG. 4 is a flowchart showing a method of displaying information in a mobile terminal according to a first embodiment of the present invention and FIG. 5 illustrates an exemplary image displayed on the mobile terminal when step S110 of FIG. 4 is performed. The method of displaying information in a mobile terminal according to the first embodiment of the present invention can be implemented in the mobile terminal 100 that has been described with reference to FIGS. 1, 2 and 3. The method of displaying information in a mobile terminal according to the first embodiment of the invention and the operation of the mobile terminal 100 for implementing the information displaying method will now be explained with reference to FIGS. 1, 4 and 5.

The controller 180 displays an image including an information region 10 for displaying a plurality of items in step S100. For example, the controller 180 can display the image including the information region 10 when a user selects a menu through the user input unit 130. The information region 10 can be displayed on the touch screen 151.

The plurality of items may include at least one of messages which include at least one of multimedia contents having at least one of a text, a still image and a moving image, a short message service (SMS) message, a multimedia messaging service (MMS) message and e-mail. The plurality of items correspond to a plurality of item groups respectively having different identifiers. For example, when the items correspond to e-mail items, at least one e-mail message received on May 25, 2009 can correspond to an item group having an identifier "May 25, 2009". Further, when the items include SMS messages, at least one SMS message received from "Hong gil-dong" can correspond to an item group having an identifier "Hong gil-dong". In addition, when the items include moving images, at least one moving image having a file extension "AVI" can correspond to an item group having an identifier "AVI".

As described above, the plurality of item groups can respective have identifiers based on various standards such as points of time when the items are generated or received, subjects that generate or transmit the items, item types, item capacities, whether the items are reproduced and whether the items are protected.

The controller 180 displays at least one of the plurality of item groups and at least one group identifier corresponding to the at least one item group in the information region 10 such that the user can scroll the at least one item group and the identifier corresponding thereto when the image including the information region 10 is displayed in step S110.

FIG. 5 illustrates an exemplary image displaying a list of received e-mail messages. Referring to FIG. 5, the controller 180 displays group identifiers 31 and 32 classified based on a receiving date and item groups 21 and 22 respectively corresponding to the group identifiers 31 and 32 in the information region 10.

For example, the first item group 21 has the first group identifier 31 and the second item group 22 has the second group identifier 32. Further, the first item group 21 includes three e-mail messages 21a, 21b and 21c received on May 25, 2009 and the second item group 22 includes two e-mail messages 22a and 22b received on May 24, 2009.

The information region 10 may be implemented in other forms. In the specification, the information region 10 is implemented as a display screen for convenience of explanation of the technical spirit of the present invention. For example, e-mail items displayed in the information region 10 may respectively include information on e-mail senders, which includes at least one of the time when e-mail is received, a name and an e-mail address. Further, the controller 180 may provide a button or an icon used to enter a screen for transmitting a response to a received e-mail message in the region displaying each of the e-mail items.

The controller 180 can display a predetermined number of items in the information region 10. Referring to FIG. 5, the controller 180 displays five e-mail messages 21a, 21b, 21c, 22a and 22b in the information region 10 (the predetermined number corresponds to 5). The controller 180 can change the number of items displayed in the information region 10 according to configuration.

Accordingly, the second item group 22 illustrated in FIG. 5 includes only the two e-mail messages 22a and 22b due to restriction on the number of items that can be displayed in the information region 10. That is, the second item group 22 can include more e-mail messages in addition to the e-mail messages 22a and 22b illustrated in FIG. 5.

The controller 180 can provide a scroll region 40 as shown in FIG. 5 to the touch screen 151 when the number of items displayable in the information region 10 is greater than the predetermined number. The scroll region 40 may include a slider 41 and scroll direction icons 42a and 42b. The slider 41 indicates a section of the whole items, to which the items currently displayed in the information region 10 belong. The user can scroll the information region 10 by operating the slider 41 and the scroll direction icons 42a and 42b.

Movement of the slider 41 in the scroll region 40 can be synchronized with scroll of the information region 10. For example, the slider 41 can move in the scroll region 40 by operating a key pad included in the user input unit 130. Further, the slider 41 can move in the scroll region 40 according to touch input applied to the information region 10 or touch input applied to the scroll region 40. The information region 10 is scrolled according to movement of the slider 41. In other words, the slider 41 moves in the scroll region 40 as the information region 10 is scrolled.

The touch input may include a dragging operation and a flicking operation. For example, the user can drag or flick the information region 10 with his or her finger to input a command for scrolling the information region 10. Further, the touch input may include a point touch. For example, the user can point-touch the scroll direction icons 42a and 42b to input the command for scrolling the information region 10.

The controller 180 receives a first scroll command for scrolling the information region 10 in a first direction in step S120. The first scroll command can be input in various manners, as described above. For example, the user drags the information region 10 upward to input the first scroll command for scrolling the information region 10 upward, as illustrated in FIG. 5. The controller 180 scrolls the information region 10 in the first direction when receiving the first scroll command in step S130.

Figure 6:
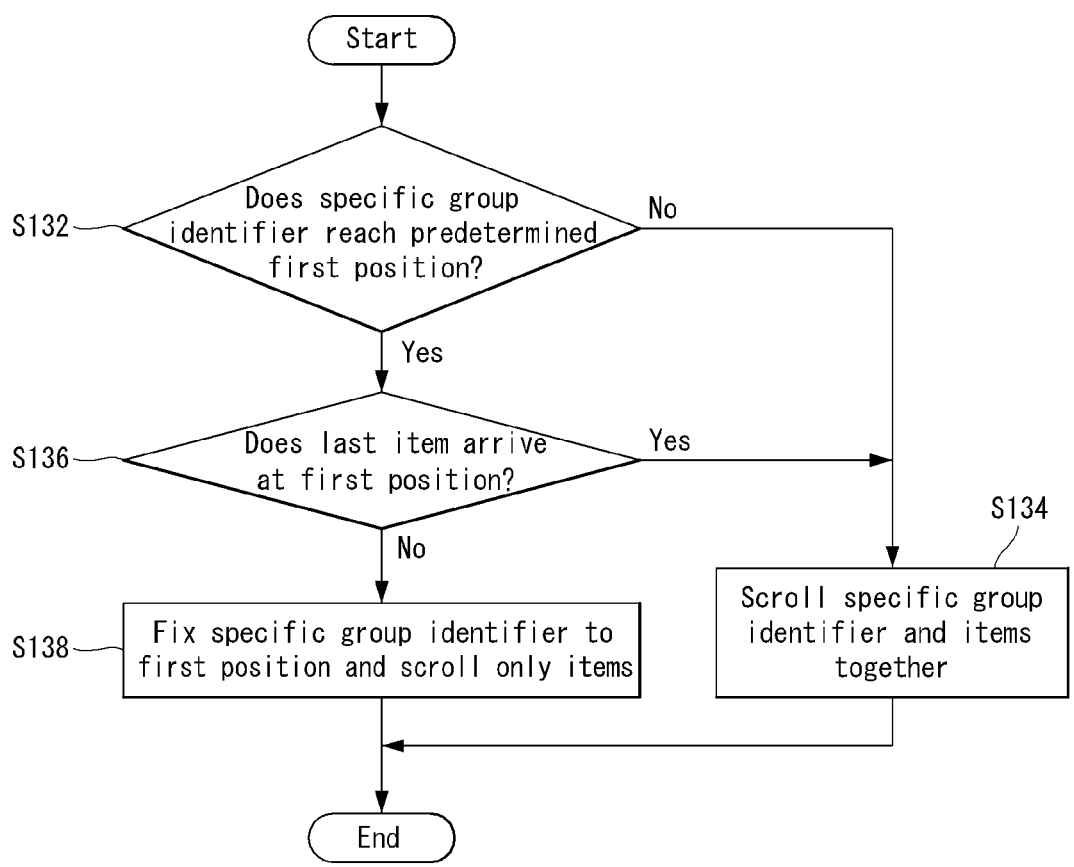
FIG. 6 is a flowchart showing the operation of step S130 of FIG. 4 according to an embodiment of the present invention.
Figure 7:
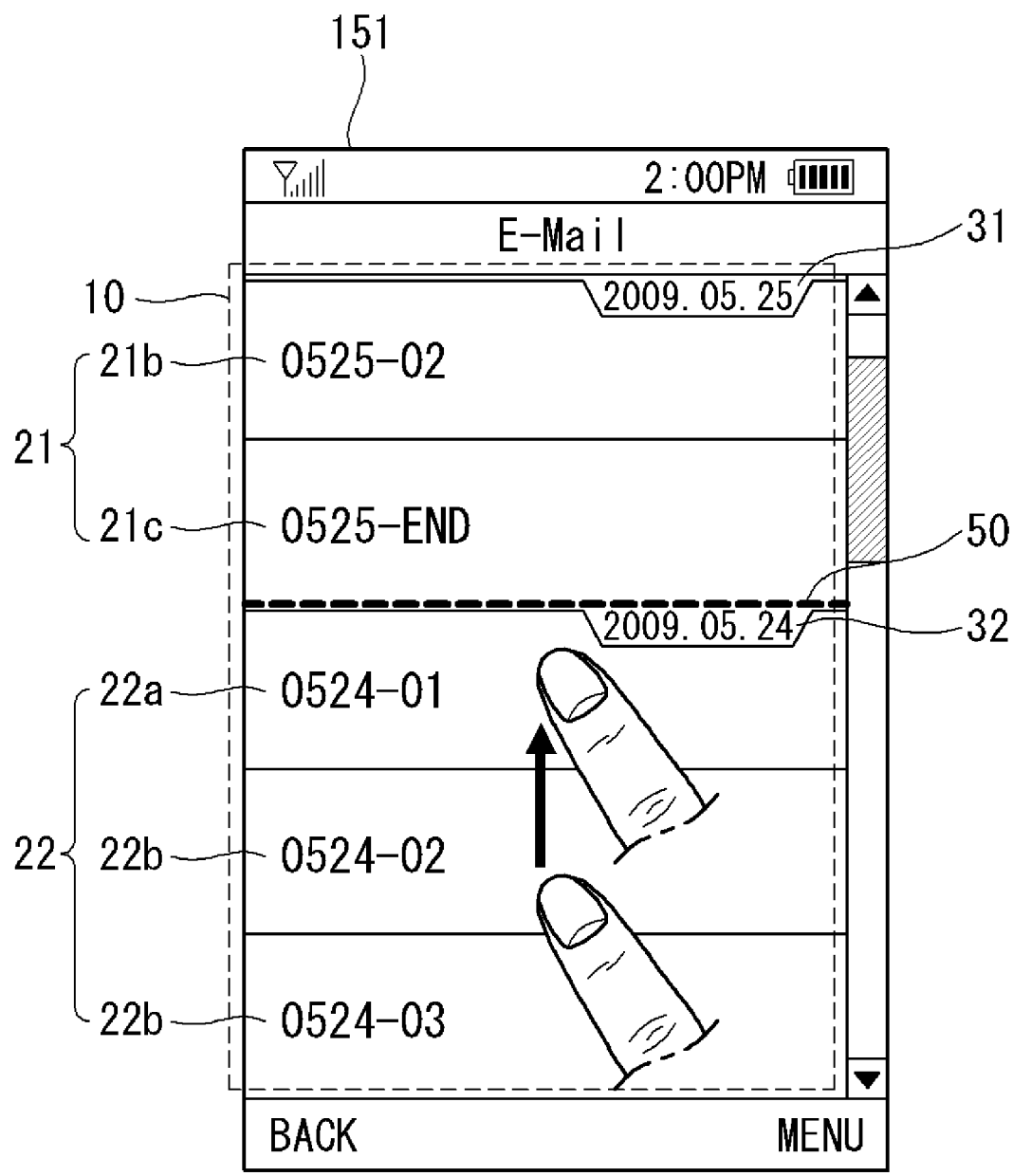
FIGS. 7, 8 and 9 illustrate exemplary images displayed when the method of displaying information in a mobile terminal according to the first embodiment of the present invention is carried out.
Figure 8:
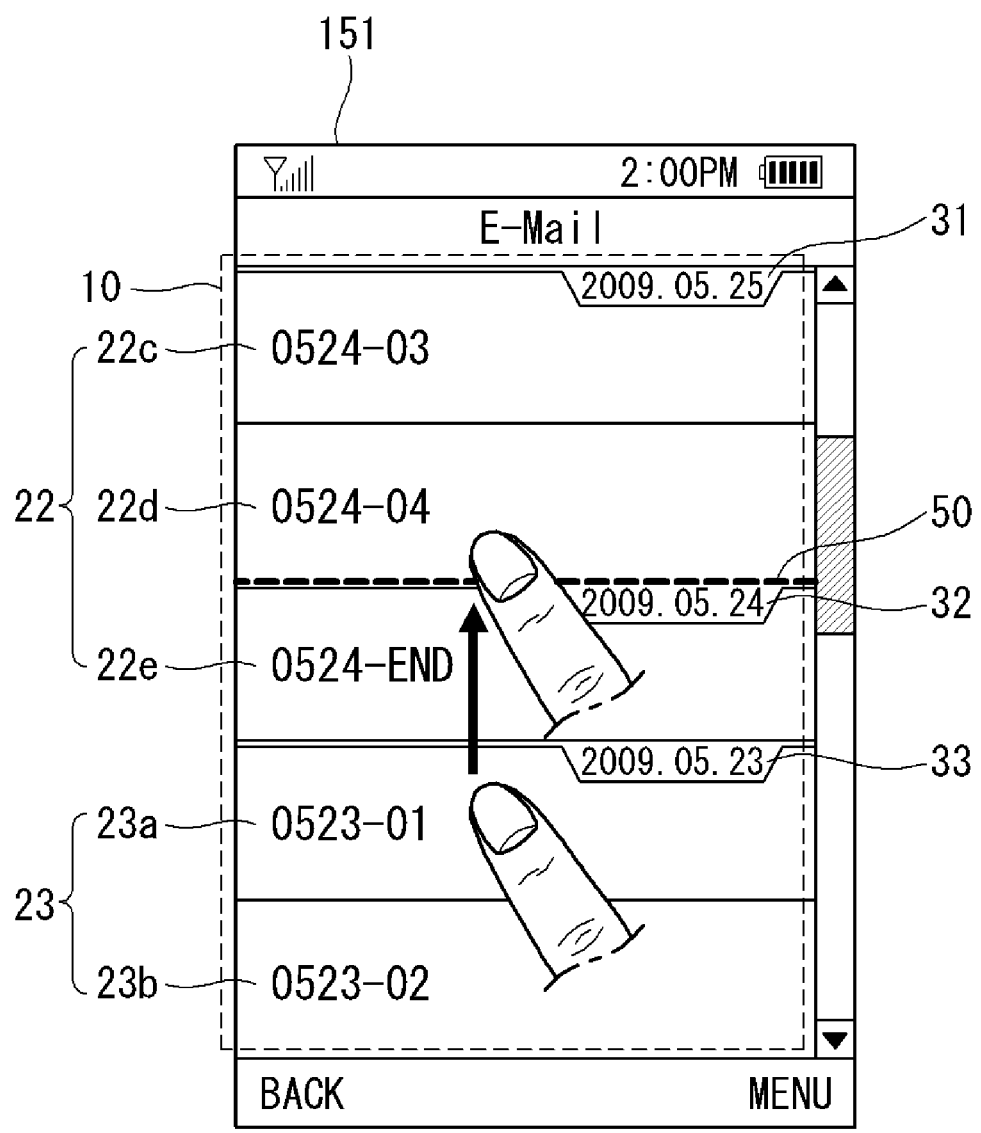
Figure 9:
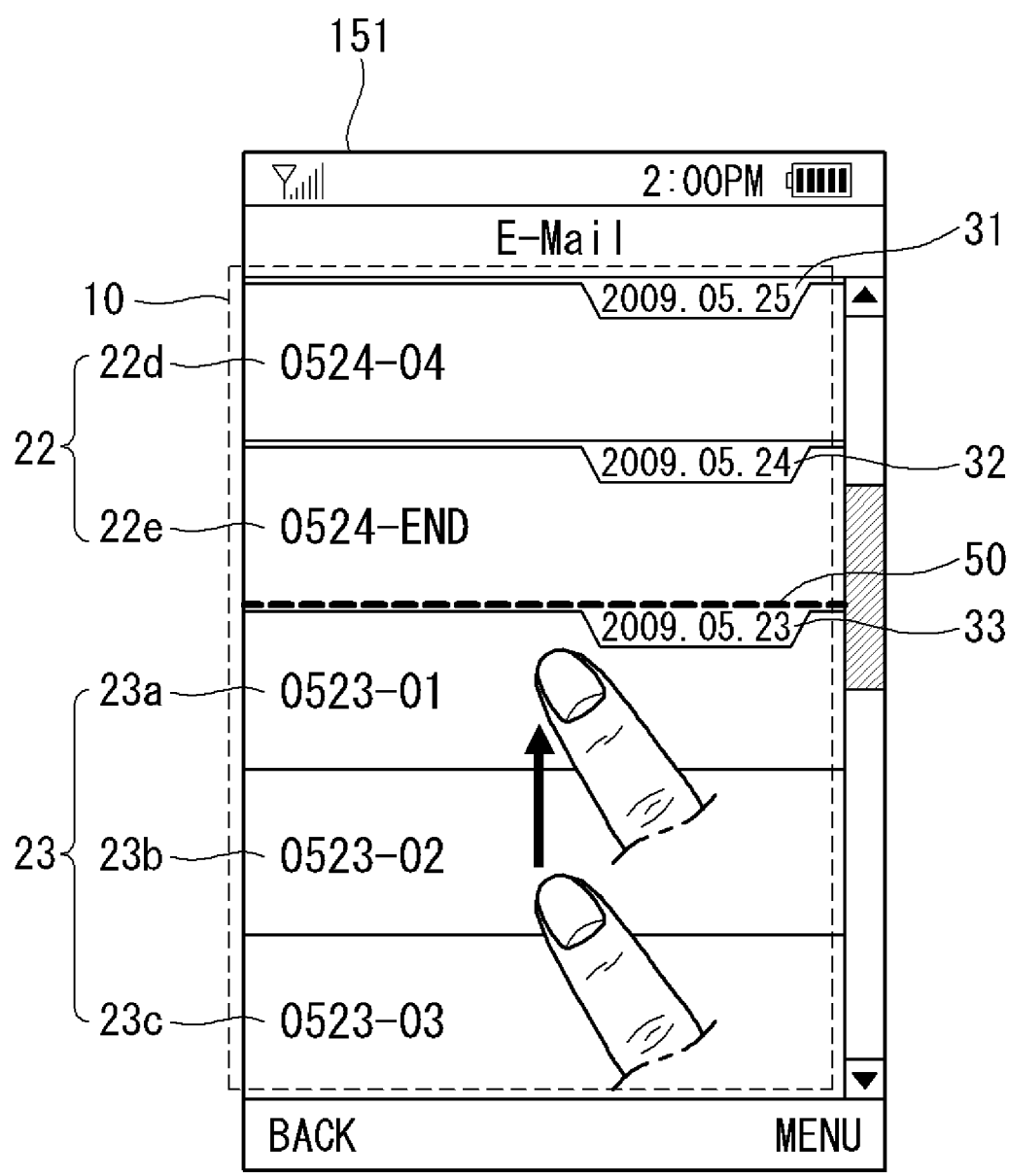

FIG. 6 is a flowchart of the operation of step S130 of FIG. 4 according to an embodiment of the present invention and FIGS. 7, 8 and 9 illustrate images displayed when the method displaying information in a mobile terminal according to the first embodiment of the present invention is carried out. The operation of step S130 according to an embodiment of the invention will now be explained with reference to FIGS. 1, 6, 7, 8 and 9.

The controller 180 determines whether a specific group identifier reaches a predetermined first position in the information region 10 when the first scroll command is received in step S132. The predetermined first position may be a position at a predetermined distance from a first boundary of the information region 10 in the first direction, which does not come into contact with the first boundary. Referring to FIG. 5, a position 50 between the item "0525_02" 21b and the item "0525_END" 21c may correspond to the predetermined first position. Assume that the position 50 between the second item and the third item displayed in the information region 10 corresponds to the predetermined first position.

Referring to FIG. 5, the first group identifier 31 is displayed in contact with the first boundary of the information region 10 located in the first direction (for example, upward direction) and the second group identifier 32 is displayed between the third item 21c and the fourth item 22a. Accordingly, there is no specific group identifier that reaches the first position 50 in the case of FIG. 5.

When the controller 180 determines that the specific group identifier does not reach the first position 50 in step S132, the controller 180 scrolls the specific group identifier and the items together in the first direction in step S134. Here, the first group identifier 31 located in contact with the first boundary may not be scrolled and may remain at the first boundary. That is, the controller 180 can maintain the specific group identifier located in contact with the first boundary in the first direction without scrolling the specific group identifier when the first scroll command is received.

FIG. 7 illustrates an image displayed when the information region 10 shown in FIG. 5 is scrolled by a single item.

When the controller 180 determines that the specific group identifier reaches the first position 50 in step S132, the controller 180 determines whether the last item of the item group corresponding to the specific group identifier reaches the first position 50 in step S136. When the controller 180 determines that the last item does not reach the first position 50 in step S136, the controller 180 fixes the specific group identifier that arrives at the first position 50 to the first position 50 and scrolls only the items in the first direction in step S138.

Referring to FIG. 7, the last item of the item group 22 corresponding to the second group identifier 32 is not displayed or corresponds to the item "0524_03" 22c. Accordingly, it can be known that the last item of the item group 22 corresponding to the second group identifier 32 does not arrive at the first position 50. Further, the second group identifier 32 has reached the first position 50 because it is displayed between the second item 21c and the third item 22a displayed on the touch screen 151.

FIG. 8 illustrates an image displayed when the information region 10 shown in FIG. 7 is scrolled by four items. For example, the controller 180 scrolls the information region 10 such that the image shown in FIG. 8 is displayed when the first scroll command for scrolling the information region 10 in the first direction by four items is received.

The information region 10 shown in FIG. 8 displays the second item group 22 and a third item group 23. Referring to FIG. 8, the second group identifier 32 is fixed to the first position 50 in spite of the first scroll command and only the items are scrolled.

When the controller 180 determines that the last item arrives at the first position 50 in step S136, the controller 180 scrolls the specific group identifier and the items in the first direction in step S134. FIG. 8 shows that the last item 22e of the second item group 22 has reached the first position 50.

FIG. 9 illustrates an image displayed when the information region 10 shown in FIG. 8 is scrolled by a single item. For example, when the controller 180 receives the first scroll command for scrolling the information region 10 upward by a single item, the controller 180 can scroll the information region 10 such that the image shown in FIG. 9 is displayed.

As described above, the last item 22e of the second item group 22 corresponding to the second group identifier 32 located at the first position 50 reaches the first position 50 in the information region 10 shown in FIG. 8. Accordingly, the controller 180 scrolls the information region 10 such that the image shown in FIG. 9 is displayed according to the first scroll command input while the image of FIG. 8 is displayed.

FIG. 9 illustrates the result obtained when the group identifiers 32 and 33 that do not come into contact with the first boundary and the item groups 22 and 23 corresponding to the group identifiers 32 and 33 are scrolled upward by a single item.

According to the above-described embodiment of the invention, the user can be easily aware of the property and category of a currently displayed item group according to a group identifier remaining in a specific position of the screen. Further, the above-described embodiment of the invention is more effective when a specific item group includes a large number of items.

FIGS. 10, 11, 12 and 13 illustrate images displayed on the mobile terminal when the method of displaying information illustrated in FIG. 4 is performed according to another embodiment of the present invention. The operation of step S130 shown FIG. 4 according to another embodiment of the invention will now be explained with reference to FIGS. 1, 10, 11, 12 and 13. The operation of step S130 according to another embodiment of the invention makes the group identifiers remain at a specific boundary of the information region 10.

As described above, the controller 180 scrolls the information region 10 when receiving the first scroll command for scrolling the information region 10 in the first direction. If the information region 10 is continuously scrolled in the first direction, a specific item belonging to a specific item group disappears from the first boundary of the information region 10, which exists in the first direction, and another item appears from a direction opposite to the first direction. Here, when the group identifiers described in the specification reach the first boundary of the information region 10, which exists in the first direction, the group identifiers do not disappear from the first boundary and may remain at the first boundary. However, the maximum number of group identifiers remaining at the first boundary may be restricted, which will be described later.

Figure 10:
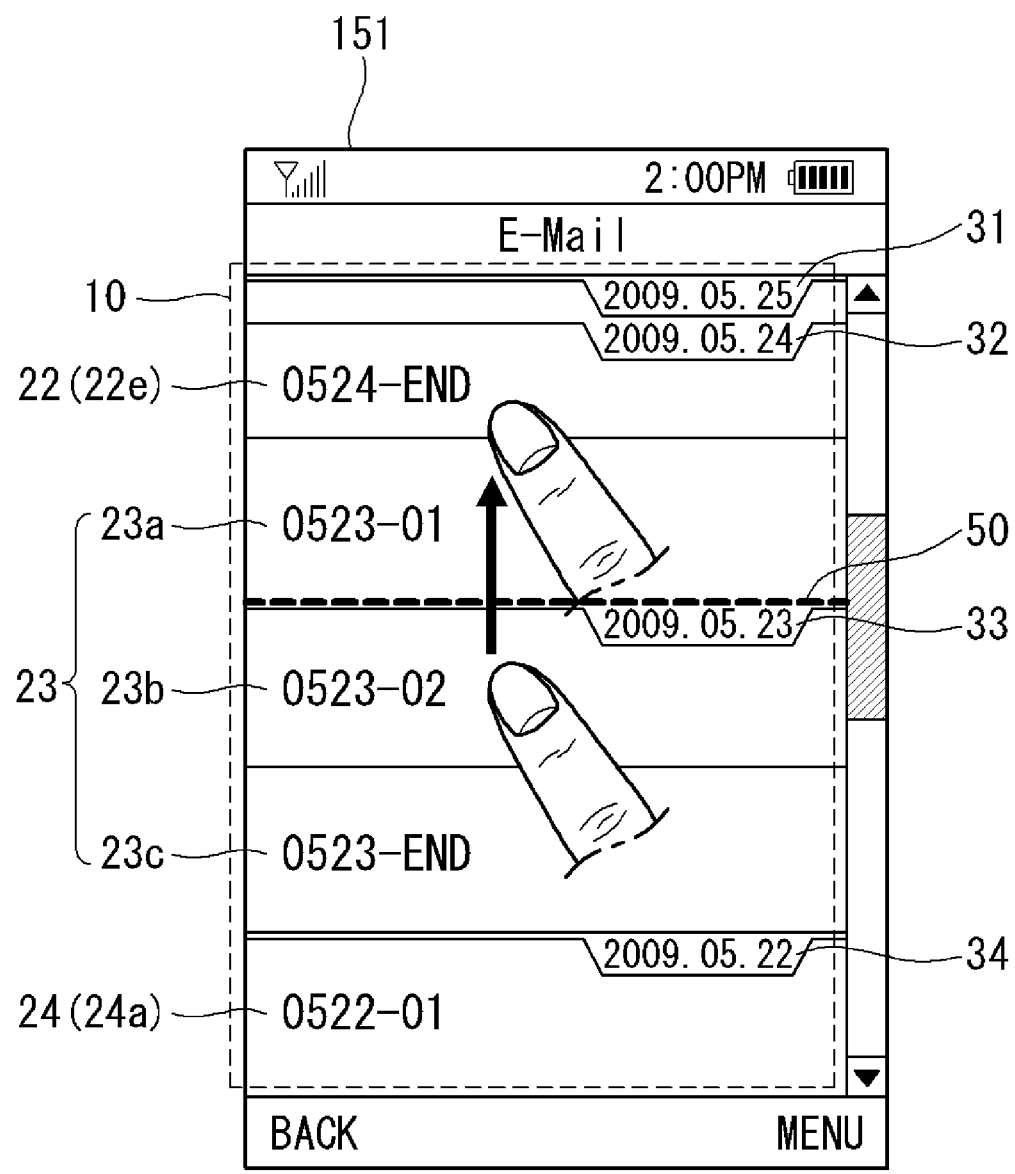
FIGS. 10, 11, 12 and 13 illustrate exemplary images displayed when the method of displaying information in a mobile terminal, illustrated in FIG. 4, is performed according to another embodiment of the present invention.

FIG. 10 illustrates an exemplary image displayed when the information region 10 shown in FIG. 9 is scrolled by a single item. The information region 10 shown in FIG. 10 displays first, second, third and fourth group identifiers 31, 32, 33 and 34 and second, third and fourth item groups 22, 23 and 24.

The controller 180 can make the first and second group identifiers 31 and 32 remain at the first boundary, as illustrated in FIG. 10. Further, the third group identifier 33 reaches the first position 50, and thus the controller 180 fixes the third group identifier 33 to the first position 50 and scrolls only the items according to the aforementioned embodiment of the invention.

Figure 11:
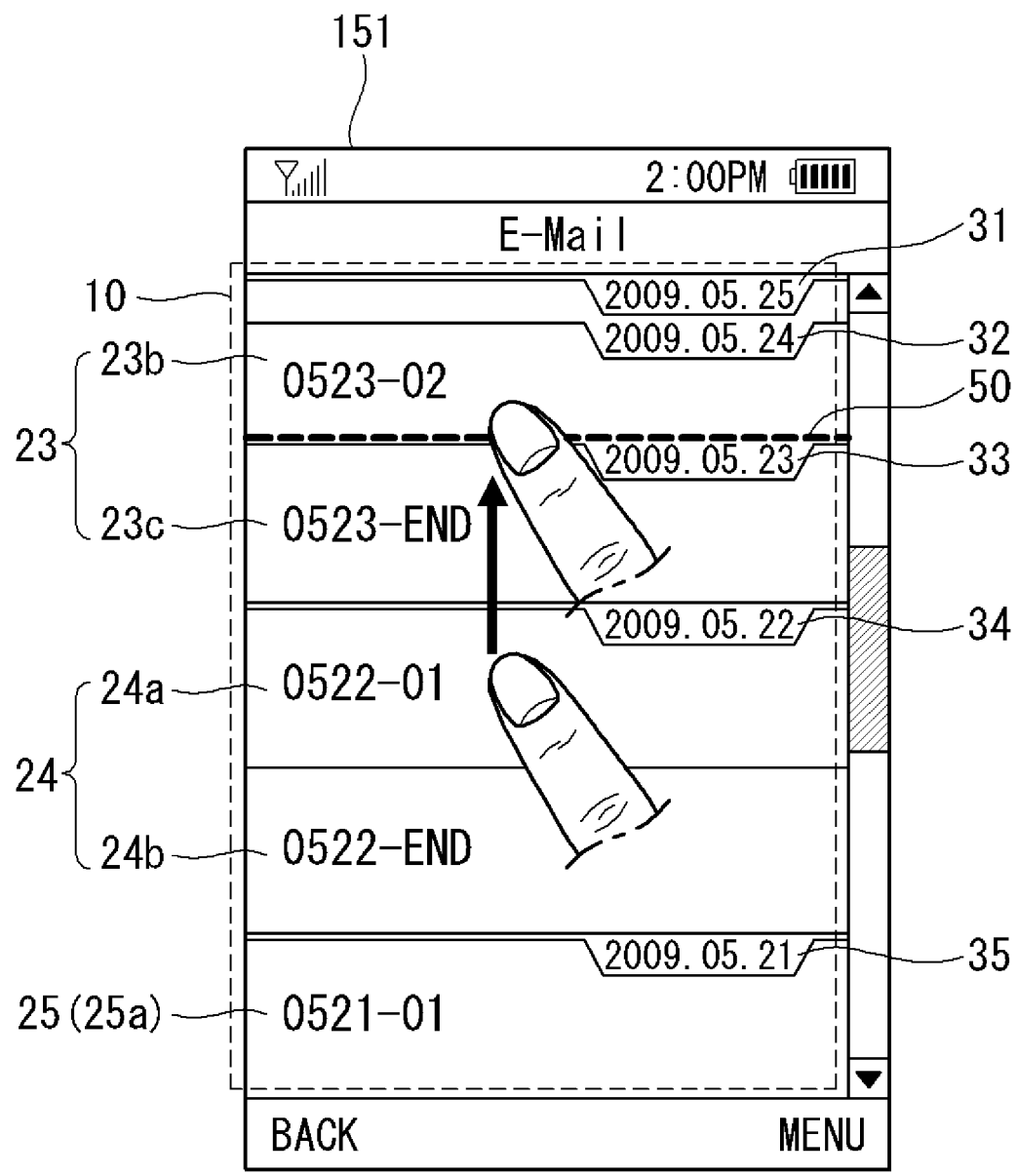

FIG. 11 illustrates an exemplary image displayed when the information region 10 shown in FIG. 10 is scrolled by two items. The information region 10 shown in FIG. 11 displays first through fifth group identifiers 31 through 35 and third, fourth and fifth item groups 23, 24 and 25. Referring to FIG. 11, the controller 180 scrolls the last item 23c of the third item group 23 and the third group identifier 33 together according to the aforementioned embodiment of the invention.

Figure 12:
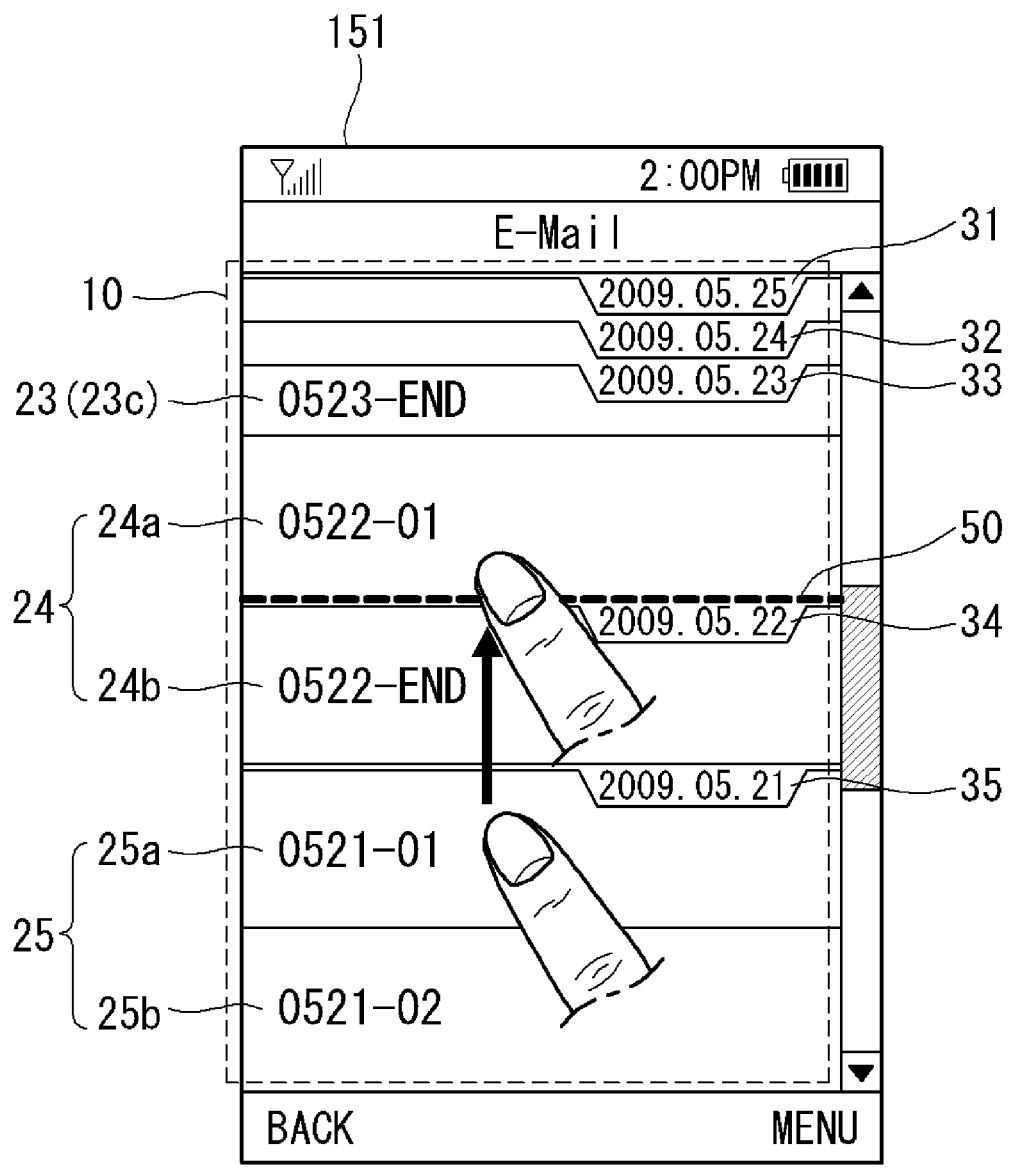

FIG. 12 illustrates an exemplary image displayed when the information region 10 shown in FIG. 11 is scrolled by a single item. The information region 10 shown in FIG. 12 displays the first through fifth group identifiers 31 through 35 and the third, fourth and fifth item groups 23, 24 and 25. Referring to FIG. 12, the controller 180 can make the first, second and third group identifiers 31, 32 and 33 remain at the first boundary.

Figure 13:
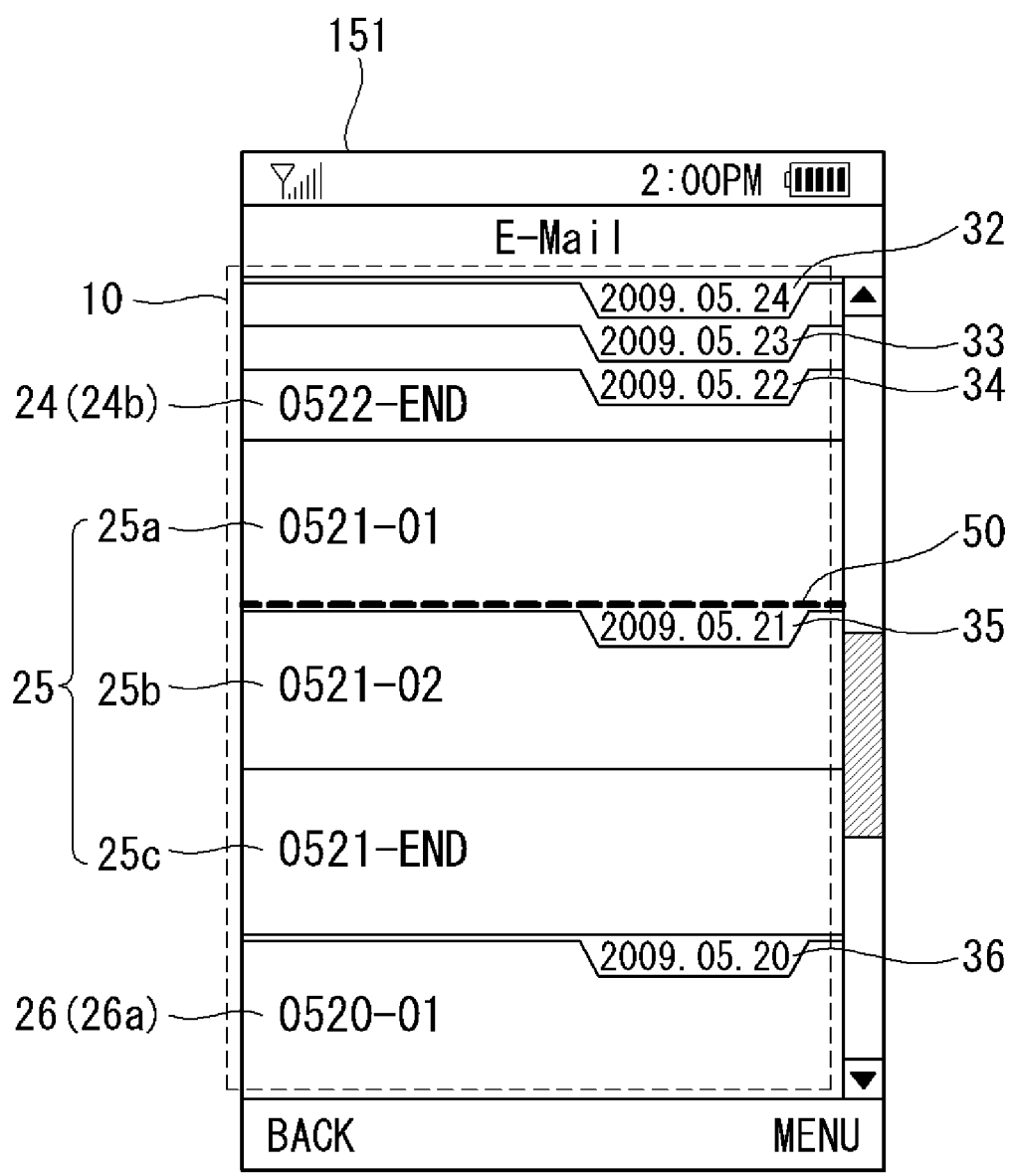

FIG. 13 illustrates an exemplary image displayed when the information region 10 shown in FIG. 12 is scrolled by two items. The information region 10 shown in FIG. 13 displays second through sixth group identifiers 32 through 36 and fourth, fifth and sixth item groups 24, and 26.

As described above, the maximum number of group identifiers remaining at the first boundary may be previously determined. For example, the maximum number of group identifiers remaining at the first boundary may be three. Referring to FIG. 13, as the fourth group identifier 34 joins the group identifiers remaining at the first boundary, the first group identifier 31 shown in FIG. 12 disappears from the first boundary, and thus the maximum number of group identifiers remaining at the first boundary can be maintained as three.

Figure 14:
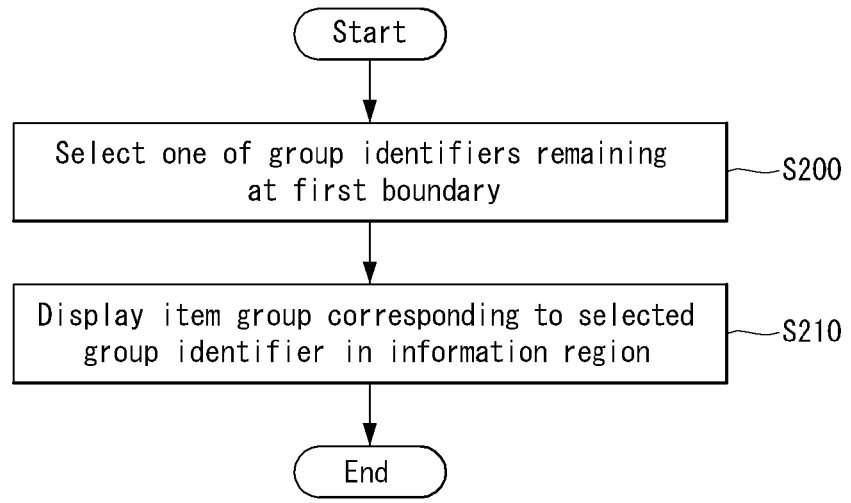
FIG. 14 is a flowchart showing a method of displaying information in a mobile terminal according to a second embodiment of the present invention.

FIG. 14 is a flowchart showing a method of displaying information in a mobile terminal according to a second embodiment of the present invention and FIGS. 15 through 19 illustrate images displayed when the method of displaying information in a mobile terminal according to the second embodiment of the present invention is carried out. The method of displaying information in a mobile terminal according to the second embodiment of the invention can be performed in the mobile terminal 100 described with reference to FIGS. 1, 2 and 3. The method of displaying information in a mobile terminal according to the second embodiment of the invention and the operation of the mobile terminal 100 for implementing the method of displaying information in a mobile terminal will now be explained in detail with reference to the attached drawings.

The method of displaying information in a mobile terminal according to the second embodiment of the invention is based on the operation of step S130 of FIG. 4 according to another embodiment of the invention (refer to FIGS. 10, 11, 12 and 13).

The controller 180 receives a signal for selecting one of the group identifiers remaining at the first boundary in step S200.

Figure 15:
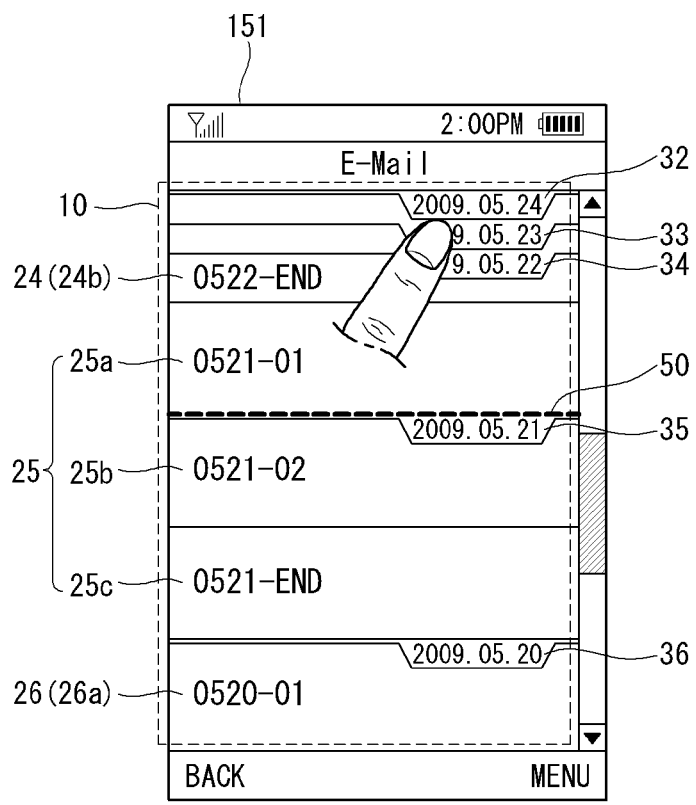
FIGS. 15 through 19 illustrate exemplary images displayed when the method of displaying information in a mobile terminal according to the second embodiment of the present invention is carried out.

FIG. 15 illustrates an exemplary image displayed when the user touches the third group identifier 33 among the second, third and fourth group identifiers 32, 33 and 34 remaining at the first boundary with his or her finger to select the third group identifier 33. The controller 180 displays an item group corresponding to the selected group identifier in the information region 10 in step S210 when the selecting signal is received in step S200. Step S210 can be performed in various manners. FIGS. 16, 17, 18 and 19 illustrate images displayed when step S210 is carried out according to various embodiments of the invention.

Figure 16:
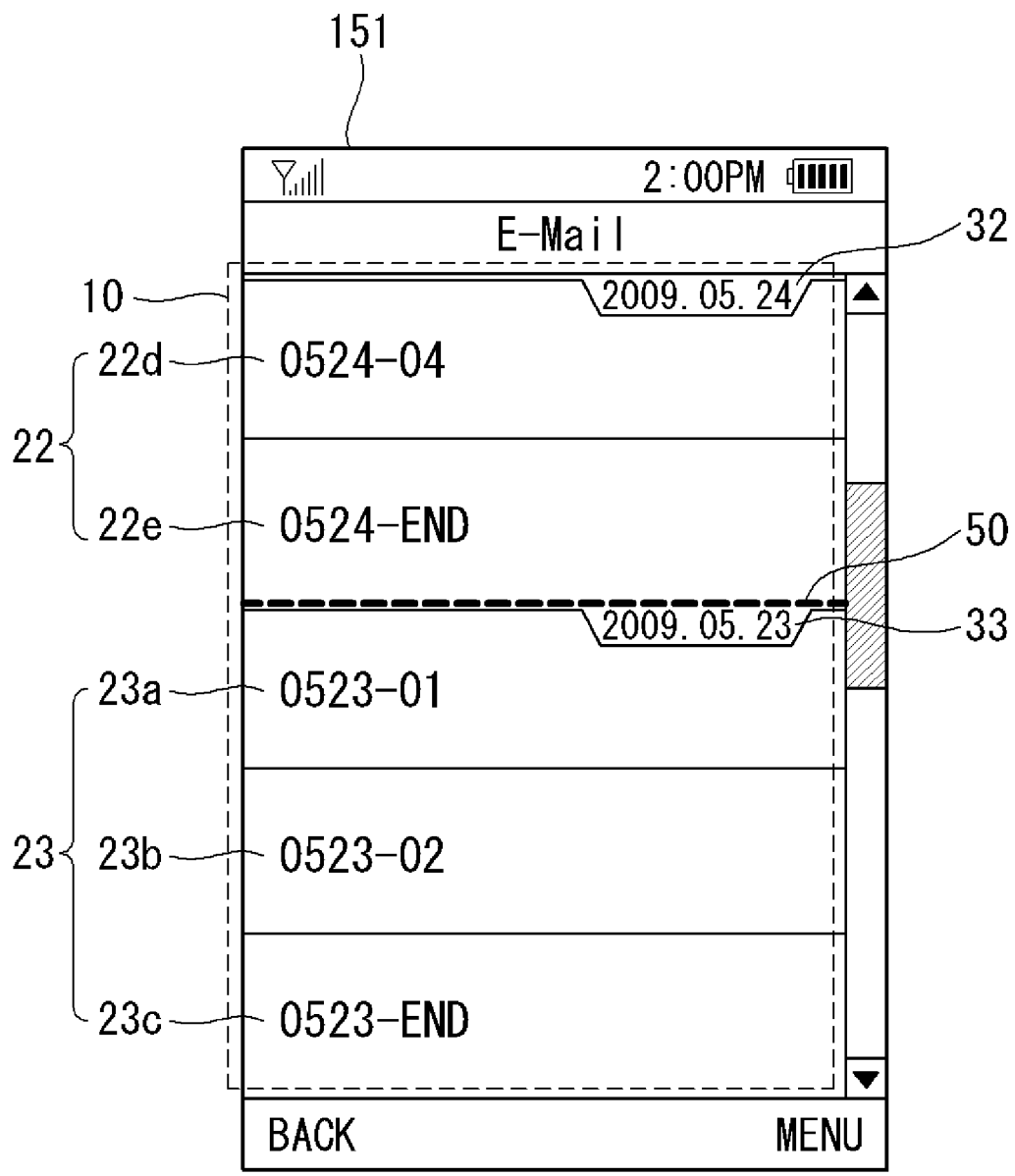

The controller 180 may display the group identifier selected in step S200 in the first position 50 and display the item group corresponding to the selected group identifier below the first position 50. For example, the controller 180 displays the selected third group identifier 33 in the first position 50 and displays the third item group 23 below the first position 50, as shown in FIG. 16.

Figure 17:
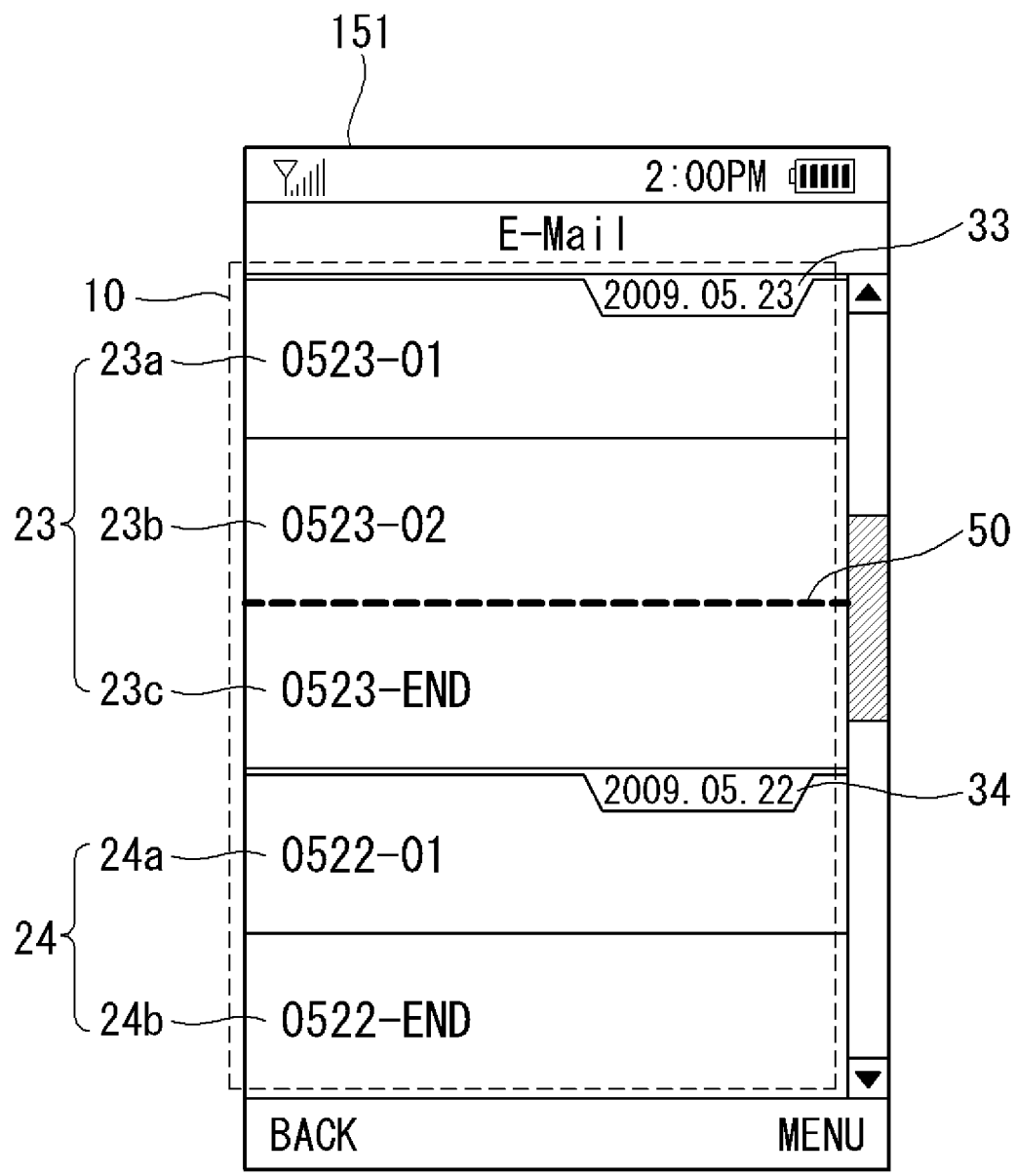

Further, the controller 180 may display the group identifier selected in step S200 at the top of the information region 10 and display the item group corresponding to the selected group identifier below the group identifier. For example, the controller 180 displays the selected third group identifier 33 at the top of the information region 10 and displays the third item group 23 below the third group identifier 33, as illustrated in FIG. 17.

Figure 18:

Further, the controller 180 may display an additional screen for displaying the item group corresponding to the group identifier selected in step S200. Referring to FIG. 18, the controller 180 displays an additional screen when the third group identifier 33 is selected and displays the third group identifier 33 and the third item group 23 on the additional screen, for example.

In FIG. 18, an icon 60 and a menu 61 are user interfaces for returning to the previous screen. For example, when the icon 60 or the menu 61 is selected, the controller 180 returns the currently displayed image to the image shown in FIG. 13.

Figure 19:
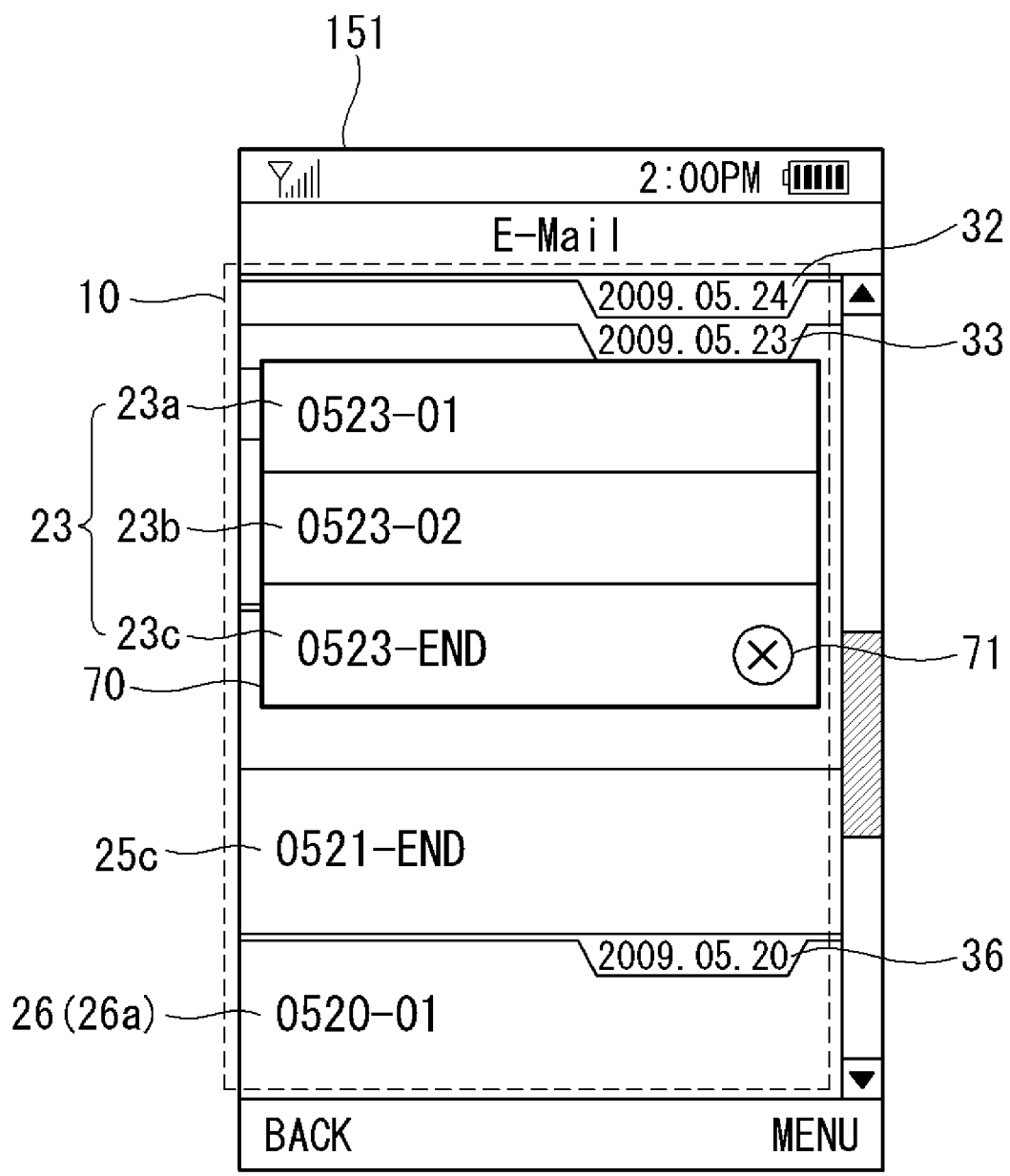

Further, the controller 180 can provide the item group corresponding to the group identifier selected in step S200 in the form of a pop-up window. For example, the controller 180 provides the third item group 23 in the form of a pop-up window 70 when the third group identifier 33 is selected, as shown in FIG. 19. In FIG. 19, an icon 71 is a user interface for closing the pop-up window 70. When the icon 71 is selected, for example, the controller 180 eliminates the pop-up window 70 from the screen.

According to the above-described embodiment, a plurality of group identifiers remain at a specific boundary of the information region 10 and an item group corresponding to a group identifier selected from the remaining group identifiers is provided to the information region 10, and thus the remaining group identifiers can function as hot keys. Further, the user can access an item group corresponding to a specific group identifier without performing an additional scroll operation.

As described above, item groups can have their own group identifiers. Here, the item groups and the group identifiers corresponding thereto can be determined according to a specific standard. The controller 180 can align and display the item groups according to the specific standard. FIG. 20 illustrates various exemplary standards for classifying a plurality of e-mail items.

Figure 21:
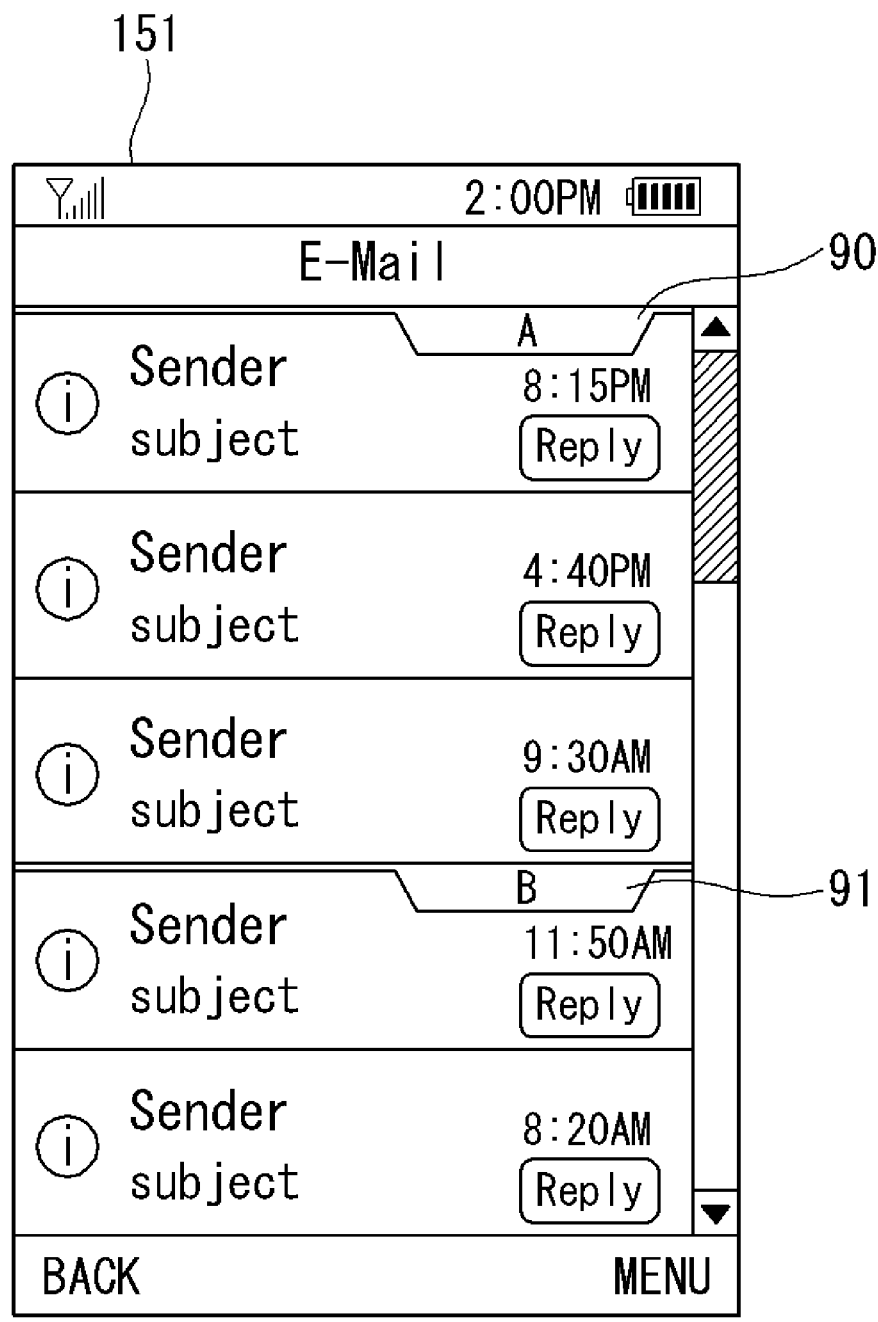
FIG. 21 illustrates a plurality of e-mail items classified and aligned based on senders.
Figure 22:
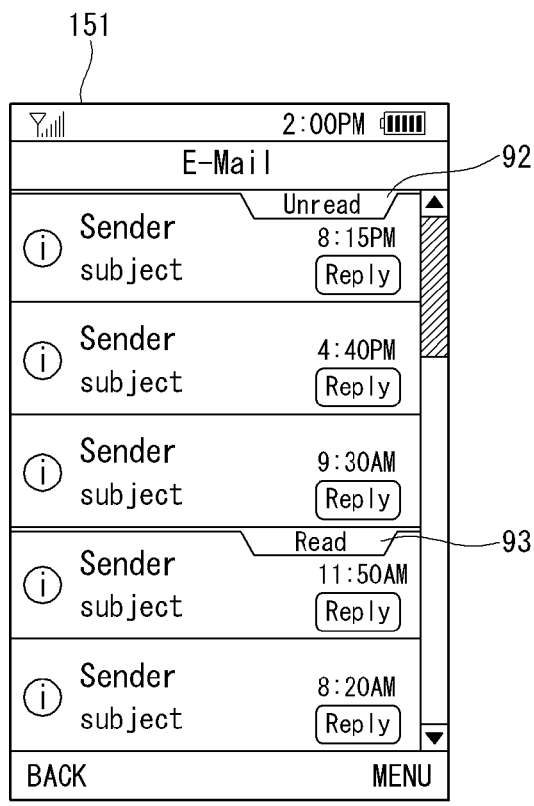
FIG. 22 illustrates the plurality of e-mail items classified and aligned based on read/unread states.

FIG. 21 illustrates a plurality of e-mail items classified and aligned based on senders and FIG. 22 illustrates the plurality of e-mail items classified and aligned based on read/unread states.

Referring to FIG. 21, the controller 180 displays a group identifier 90 corresponding to a sender "A" and a group identifier 91 corresponding to a sender "B" on the display unit 151.

Referring to FIG. 22, the controller 180 displays a group identifier 92 corresponding to "Unread" and a group identifier 93 corresponding to "Read" on the display unit 51.

In the above-described embodiments of the invention, the information region 10 is scrolled upward. However, the present invention is not limited thereto. For example, the above-described embodiments can be applied to the present invention even when the information region 10 is scrolled downward. Further, when the information region 10 is scrolled downward, the above-described embodiments can be reversely applied to the present invention (refer to FIGS. 5 and 7 through 13). That is, if the information region 10 is continuously scrolled downward in the display state shown in FIG. 13, images shown in FIGS. 12, 11, 10, 9, 8 and 7 can be sequentially displayed.

Further, the above-described embodiments can be applied to the present invention even when the information region 10 is scrolled in an arbitrary direction.

Figure 23:
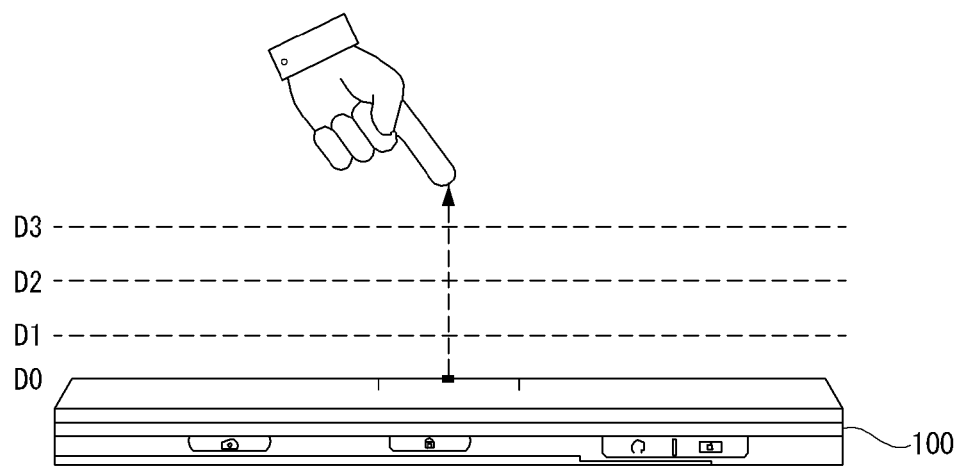
FIG. 23 is a conceptional view for explaining a proximity depth of a proximity sensor.

The proximity sensor 141 described with reference to FIG. 1 will now be explained in more detail with reference to FIG. 23. FIG. 23 is a conceptional view for explaining a proximity depth of the proximity sensor.

As shown in FIG. 23, when a pointer such as a user's finger approaches the touch screen, the proximity sensor 141 located inside or near the touch screen senses the approach and outputs a proximity signal. Further, the proximity sensor 141 can be constructed such that it outputs a proximity signal according to the distance between the pointer approaching the touch screen and the touch screen (referred to as "proximity depth").

Also, the distance in which the proximity signal is output when the pointer approaches the touch screen is referred to as a detection distance. The proximity depth can be determined using a plurality of proximity sensors having different detection distances and comparing proximity signals respectively output from the proximity sensors.

FIG. 23 shows the section of the touch screen in which proximity sensors capable of sensing three proximity depths are arranged. Of course, proximity sensors capable of sensing less than three or more than three proximity depths can be arranged in the touch screen.

Thus, as shown in FIG. 23, when the pointer (user's finger in this example) completely comes into contact with the touch screen (D0), the controller 180 recognizes this action as the contact touch. When the pointer is located within a distance D1 from the touch screen, the controller 180 recognizes this action as a proximity touch of a first proximity depth.

Similarly, when the pointer is located in a range between the distance D1 and a distance D2 from the touch screen, the controller 180 recognizes this action as a proximity touch of a second proximity depth. When the pointer is located in a range between the distance D2 and a distance D3 from the touch screen, the controller 180 recognizes this action a proximity touch of a third proximity depth. Also, when the pointer is located at longer than the distance D3 from the touch screen, the controller 180 recognizes this action as a cancellation of proximity touch.

Accordingly, the controller 180 can recognize the proximity touch as various input signals according to the proximity distance and proximity position of the pointer with respect to the touch screen and perform various operations according to the input signals.

The above-described information displaying method in a mobile terminal according to the present invention can be written as computer programs and can be implemented in digital computers that execute the programs using a computer readable recording medium. The information displaying method in a mobile terminal according to embodiments of the present invention can be executed through software. The software can include code segments that perform required tasks. Programs or code segments can also be stored in a processor readable medium and transmitted.

The computer readable recording medium includes all types of recording devices storing data readable by computer systems. Examples of the computer readable recording medium include ROM, RAM, CD-ROM, DVD±ROM, DVD-RAM, magnetic tapes, floppy disks, hard disks, and optical data storage devices. The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A mobile terminal comprising:
a memory configured to store a plurality of items, each of the plurality of items corresponding to one of a plurality of item groups, each of the plurality of item groups having a corresponding group identifier;
a display having an information region configured to display at least one of the plurality of item groups with its corresponding group identifier; and
a controller configured to scroll the displayed at least one of the plurality of item groups and its corresponding group identifier in the information region of the display in response to an input received by the mobile terminal,
wherein a corresponding group identifier of a first of the plurality of item groups is a first group identifier,
wherein the controller is further configured to fix a position of the first group identifier at a predetermined first position in the information region of the display during scrolling in a first direction upon the first group identifier and a first item of the first of the plurality of item groups reaching the first position in the information region, and
wherein the controller is further configured to maintain the first group identifier at the first position in the information region during continued scrolling in the first direction until a last item of the first of the plurality item groups scrolls past the first position in the information region.

2. The mobile terminal of claim 1, wherein the predetermined first position of the information region is located a predetermined distance away from a first boundary of the information region, the first boundary being at an edge of the information region toward which item groups being scrolled in the first direction approach.

3. The mobile terminal of claim 2, wherein the controller is further configured to scroll the first group identifier and the last item of the first of the plurality of item groups together in the first direction during scrolling in the first direction after the last item of the first of the plurality of item groups scrolls past the first position of the information region.

4. The mobile terminal of claim 3, wherein the controller is further configured to display the first group identifier at the first boundary of the information region during scrolling in the first direction when the last item of the first of the plurality of item groups scrolls past the first boundary of the information region.

5. The mobile terminal of claim 4, wherein the controller is further configured to display a group identifier of an item group subsequent to the first of the plurality of item groups at the first boundary of the information region upon a last item of the subsequent item group scrolling in the first direction past the first boundary of the information region.

6. The mobile terminal of claim 5, wherein the maximum number of group identifiers that may be displayed at the first boundary of the information region is fixed.

7. The mobile terminal of claim 6, wherein the controller is further configured to display an item group on the information region that corresponds to a group identifier selected from group identifiers displayed at the first boundary of the information region.

8. The mobile terminal of claim 7, wherein the controller is further configured to display the selected group identifier at the first position of the information region and to display the item group corresponding to the selected group identifier before the first position of the information region in relation to the first direction.

9. The mobile terminal of claim 1, wherein the controller is further configured to align and display the plurality of item groups according to categories to which each of the plurality of item groups belong.

10. The mobile terminal of claim 9, wherein the categories include at least points of time when each of the plurality of items is generated or received, subjects that generate or transmit each of the plurality of items, item types, item capacities, whether each of the plurality of items is reproduced or whether each of the plurality of items is protected.

11. The mobile terminal of claim 1, wherein the display includes a touch screen configured to receive the input to scroll the displayed at least one of the plurality of item groups and the corresponding group identifier via a touch input applied to the information region of the touch screen.

12. The mobile terminal of claim 1, wherein each of the plurality of items include at least multimedia contents or a message, wherein the multimedia contents comprise at least text, a still image or a moving image and the message comprises at least a short message service (SMS) message, a multimedia messaging service (MMS) message or an e-mail message.

13. A method of displaying information in a mobile terminal, the method comprising:
displaying an information region on a display, the information region being configured to display a plurality of items, each of the plurality of items corresponding to one of a plurality of item groups, each of the plurality of item groups having a corresponding group identifier;
displaying at least one of the plurality of item groups in the information region with its corresponding group identifier; and
scrolling via a controller the displayed at least one of the plurality of item groups and the corresponding group identifier in a first direction in the information region in response to an input received by the mobile terminal,
wherein a corresponding group identifier of a first of the plurality of item groups is a first group identifier,
wherein scrolling the displayed at least one of the plurality of item groups in the first direction comprises:
fixing a position of the first group identifier at a predetermined first position in the information region upon the first group identifier and a first item of the first of the plurality of item groups reaching the first position in the information region, and
maintaining the first group identifier at the first position in the information region until a last item of the first of the plurality of item groups scrolls past the first position in the information region.

14. The method of claim 13, wherein the predetermined first position of the information region is located a predetermined distance away from a first boundary of the information region, the first boundary being at an edge of the information region toward which item groups being scrolled in the first direction approach.

15. The method of claim 14, wherein scrolling the displayed at least one of the plurality of item groups in the first direction further comprises scrolling the first group identifier and the last item of the first of the plurality of item groups together in the first direction after the last item of the first of the plurality of item groups scrolls past the first position of the information region.

16. The method of claim 15, wherein scrolling the displayed at least one of the plurality of item groups in the first direction further comprises displaying the first group identifier at the first boundary of the information region when the last item of the first of the plurality of item groups scrolls past the first boundary of the information region.

17. The method of claim 16, wherein scrolling the displayed at least one of the plurality of item groups in the first direction further comprises displaying a group identifier of an item group subsequent to the first of the plurality of item groups at the first boundary of the information region upon a last item of the subsequent item group scrolling in the first direction past the first boundary of the information region, and the maximum number of group identifiers that may be displayed at the first boundary of the information region is fixed.

18. The method of claim 17, further comprising displaying an item group on the information region that corresponds to a group identifier selected from group identifiers displayed at the first boundary of the information region.

19. The method of claim 13, wherein the plurality of items include at least multimedia contents or a message, wherein the multimedia contents comprise at least text, a still image or a moving image and the message comprises at least a short message service (SMS) message, a multimedia messaging service (MMS) message or an e-mail message.

20. The mobile terminal of claim 13, further comprising aligning and displaying the plurality of item groups via the controller according to categories to which each of the plurality of item groups belong,
wherein the categories include at least points of time when each of the plurality of items is generated or received, subjects that generate or transmit each of the plurality of items, item types, item capacities, whether each of the plurality of items is reproduced or whether each of the plurality of items is protected.

* * * * *